United States Patent
Choi et al.

(10) Patent No.: US 12,270,233 B2
(45) Date of Patent: Apr. 8, 2025

(54) VEHICLE DOOR OPENING AND CLOSING APPARATUS

(71) Applicants: Hyundai Motor Company, Seoul (KR); Kia Corporation, Seoul (KR); SUNG WOO HITECH CO., LTD., Busan (KR)

(72) Inventors: Je Won Choi, Anyang-si (KR); Jae Heon Lee, Yangsan-si (KR)

(73) Assignees: Hyundai Motor Company, Seoul (KR); Kia Corporation, Seoul (KR); SUNG WOO HITECH CO., LTD., Busan (KR)

( * ) Notice: Subject to any disclaimer, the term of this patent is extended or adjusted under 35 U.S.C. 154(b) by 390 days.

(21) Appl. No.: 17/969,477

(22) Filed: Oct. 19, 2022

(65) Prior Publication Data

US 2023/0340805 A1    Oct. 26, 2023

(30) Foreign Application Priority Data

Apr. 22, 2022    (KR) .................. 10-2022-0050242

(51) Int. Cl.
| | | |
|---|---|---|
| *E05B 81/14* | (2014.01) | |
| *B60J 5/06* | (2006.01) | |
| *E05B 81/30* | (2014.01) | |
| *E05B 81/34* | (2014.01) | |
| *E05B 83/40* | (2014.01) | |
| *E05D 3/02* | (2006.01) | |

(Continued)

(52) U.S. Cl.
CPC ................ *E05B 81/14* (2013.01); *B60J 5/06* (2013.01); *E05B 81/30* (2013.01); *E05B 81/34* (2013.01); *E05B 83/40* (2013.01); *E05D 15/0621* (2013.01); *E05D 15/1047* (2013.01); *E05D 3/02* (2013.01); *E05D 2015/485* (2013.01); *E05Y 2201/64* (2013.01); *E05Y 2201/684* (2013.01); *E05Y 2900/531* (2013.01)

(58) Field of Classification Search
CPC .......... E05B 81/14; E05B 81/30; E05B 81/34; E05B 83/40; E05B 81/06; E05B 81/76; E05B 83/38; E05B 81/18; B60J 5/06; B60J 5/047; E05D 15/0621; E05D 15/1047; E05D 3/02; E05D 2015/485; E05D 15/48; E05Y 2201/64; E05Y 2900/531; E05Y 2201/692
See application file for complete search history.

(56) References Cited

U.S. PATENT DOCUMENTS 11,472,271 B2 * 10/2022 Choi ..................... B60J 5/047
11,512,515 B2 * 11/2022 Choi ..................... B60J 5/0473
(Continued)

FOREIGN PATENT DOCUMENTS

KR    20210057616 A    5/2021

*Primary Examiner* — Lori Lyjak
(74) *Attorney, Agent, or Firm* — Slater Matsil, LLP

(57) ABSTRACT

An embodiment is a vehicle door opening and closing apparatus. The vehicle door opening and closing apparatus including a vehicle door, a rail mounted on a vehicle body, a roller unit mounted on the vehicle door, the roller unit configured to move along the rail and allow the vehicle door to open and close in a mode selected from a swing mode and a sliding mode, and a hold lock mounted on the vehicle body, the hold lock including a passing rod configured to releasably hold the roller unit in a predetermined position.

20 Claims, 33 Drawing Sheets

(51) Int. Cl.
  *E05D 15/06* (2006.01)
  *E05D 15/10* (2006.01)
  *E05D 15/48* (2006.01)

(56) References Cited

U.S. PATENT DOCUMENTS

| | | | |
|---|---|---|---|
| 11,572,726 B2* | 2/2023 | Choi | E05B 85/243 |
| 11,643,860 B2* | 5/2023 | Choi | E05F 15/638 |
| | | | 49/362 |
| 11,725,448 B2* | 8/2023 | Choi | E05F 15/619 |
| | | | 49/362 |
| 11,745,568 B2* | 9/2023 | Choi | E05D 15/1047 |
| | | | 296/146.1 |
| 11,781,367 B2* | 10/2023 | Choi | E05F 15/619 |
| | | | 49/362 |
| 11,808,065 B2* | 11/2023 | Lee | E05B 85/16 |
| 11,945,288 B2* | 4/2024 | Choi | E05B 85/26 |
| 11,987,106 B2* | 5/2024 | Choi | E05D 11/1057 |
| 12,139,942 B2* | 11/2024 | Choi | E05B 85/045 |
| 2021/0140215 A1 | 5/2021 | Choi | |

* cited by examiner

VEHICLE DOOR OPENING AND CLOSING APPARATUS

CROSS-REFERENCE TO RELATED APPLICATIONS

This application is based on and claims the benefit of priority to Korean Patent Application No. 10-2022-0050242, filed on Apr. 22, 2022, in the Korean Intellectual Property Office, the disclosure of which is incorporated herein in its entirety by reference.

TECHNICAL FIELD

The present disclosure relates to a vehicle door opening and closing apparatus.

BACKGROUND

Vehicles have door apertures for ingress and egress of passengers to and from a passenger compartment. A vehicle door is closed to cover the door aperture and is opened to enable ingress and egress of passengers to and from the passenger compartment through the door aperture. Vehicle doors are divided into swing doors and sliding doors. The swing door is opened and closed by swinging around a hinge mounted between the swing door and the vehicle body. The sliding door is opened and closed by sliding a roller mounted on the sliding door along a rail mounted on the vehicle body.

The swing door is very easy to open and close, thereby enabling quick ingress and egress of passengers. However, when the swing door is opened, a space for ingress and egress is relatively small. When the vehicle is located in a narrow space, a swing trajectory of the door is not secured, which makes the opening and closing operation thereof difficult.

The sliding door is very easy to open and close even when the vehicle is located in a narrow space. When the sliding door is opened, a space for ingress and egress is relatively large. However, the sliding door requires relatively much force and time to open and close, which hinders quick ingress and egress of passengers.

According to the related art, as a vehicle door is operated by a single opening and closing method, it may be difficult to adequately respond to the needs of users seeking ease of use, diversity, and novelty.

The above information described in this background section is provided to assist in understanding the background of the embodiments of the invention, and may include technical concepts that do not form the prior art that is already known to a person of ordinary skill in the art.

SUMMARY

The present disclosure relates to a vehicle door opening and closing apparatus allowing a vehicle door to open and close in any one mode selected from a swing mode and a sliding mode. More particularly, the present disclosure relates to a vehicle door opening and closing apparatus including a body-side hold lock mounted on a vehicle body and releasably holding a roller unit, thereby improving locking stiffness between the body-side hold lock and the roller unit.

The present disclosure has been made to solve the above-mentioned problems occurring in the prior art while advantages achieved by the prior art are maintained intact.

An aspect of the present disclosure provides a vehicle door opening and closing apparatus including a body-side hold lock mounted on a vehicle body and releasably holding a roller unit, thereby improving locking stiffness between the body-side hold lock and the roller unit.

According to an aspect of the present disclosure, a vehicle door opening and closing apparatus may include a vehicle door, a rail mounted on a vehicle body, a roller unit mounted on the vehicle door, moving along the rail, and allowing the vehicle door to open and close in any one mode selected from a swing mode and a sliding mode. The vehicle door opening and closing apparatus may further include a body-side hold lock mounted on the vehicle body and a passing rod releasably holding the roller unit in a predetermined position.

The roller unit may include a body having a through hole, and the passing rod may releasably engage with the through hole of the body.

A longitudinal axis of the passing rod may be perpendicular to a plane of the body, and the passing rod may move in a direction perpendicular to the plane of the body.

The passing rod may be moved by an actuator in a direction perpendicular to a plane of the body. The actuator may have a drive gear, and the passing rod may have a plurality of teeth meshing with the drive gear.

The plurality of teeth may be spaced apart from each other in a longitudinal direction of the passing rod.

The passing rod may have a stopper provided on a middle portion thereof, and an outer diameter of the stopper may be greater than an outer diameter of the passing rod.

The vehicle door opening and closing apparatus may further include a grip member mounted in the through hole of the body. The grip member may grip the passing rod when the passing rod passes through the through hole of the body.

The grip member may have a hole defined therein, and the passing rod may be inserted into the hole of the grip member.

The grip member may include a cylindrical portion inserted into the through hole of the body, a head portion provided on an upper end of the cylindrical portion, and a hook provided on a lower end of the cylindrical portion.

The head portion may be attached to an upper surface of the body adjacent to the through hole, and the hook may be attached to a lower surface of the body adjacent to the through hole.

The grip member may have a plurality of slits provided in the cylindrical portion and the hook, the plurality of slits may be spaced apart from each other in a circumferential direction of the cylindrical portion, and each slit may extend in a longitudinal direction of the cylindrical portion.

The grip member may further include a plurality of pads provided on an outer circumferential surface of the cylindrical portion.

The plurality of pads may be provided between the plurality of slits.

The grip member may have a chamfer provided on an inner peripheral edge of the head portion.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

Figure 1:
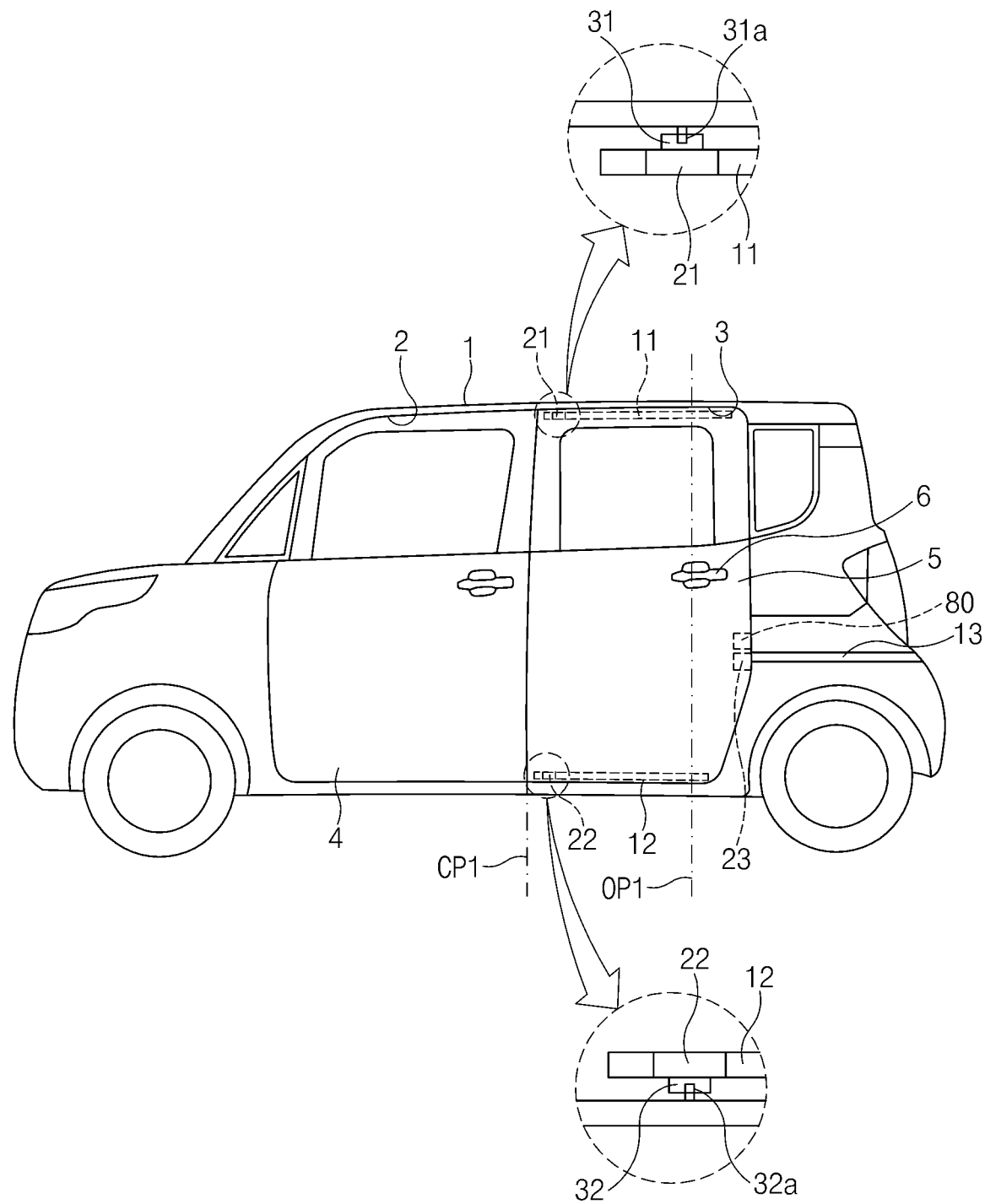
FIG. 1 illustrates a vehicle door opening and closing apparatus according to an exemplary embodiment of the present disclosure, which is mounted on a rear door of a vehicle.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

A vehicle door opening and closing apparatus, according to exemplary embodiments of the present disclosure, may allow a vehicle door to open and close selectively in any one mode of a sliding mode and a swing mode. In other words, the vehicle door opening and closing apparatus, according to exemplary embodiments of the present disclosure, may be a transform-type door opening and closing apparatus. The sliding mode may allow the vehicle door to open and close by sliding in a longitudinal direction of a vehicle, and the swing mode may allow the vehicle door to open and close by swinging inwards and outwards.

Referring to FIG. 1, a vehicle body 1 may have a plurality of door apertures 2 and 3, and the plurality of door apertures 2 and 3 may be divided into a front aperture 2 and a rear aperture 3. A plurality of vehicle doors 4 and 5 may include a front door 4 covering and uncovering the front aperture 2, and a rear door 5 covering and uncovering the rear aperture 3. As the front door 4 is opened, the front door 4 may uncover the front aperture 2, and as the front door 4 is closed, the front door 4 may cover the front aperture 2. As the rear door 5 is opened, the rear door 5 may uncover the rear aperture 3, and as the rear door 5 is closed, the rear door 5 may cover the rear aperture 3.

The vehicle door opening and closing apparatus, according to exemplary embodiments of the present disclosure, may be applied to the front door 4, the rear door 5, and the like. FIGS. 1 to 4 illustrate a vehicle door opening and closing apparatus according to exemplary embodiments of the present disclosure, which is applied to the rear door 5. Hereinafter, the rear door 5 will be referred to as the vehicle door 5, and the rear aperture 3 will be referred to as the door aperture 3.

The vehicle door opening and closing apparatus, according to exemplary embodiments of the present disclosure, may include one or more rails 11 and 12 mounted on the vehicle body 1, and the rails 11 and 12 may extend in the longitudinal direction of the vehicle. Referring to FIG. 1, an upper rail 11 may be mounted on an upper edge of the vehicle body 1, and a lower rail 12 may be mounted on a lower edge of the vehicle body 1. The upper rail 11 and the lower rail 12 may extend in the longitudinal direction of the vehicle. The upper rail 11 may be disposed on an upper edge of the door aperture 3, and the lower rail 12 may be disposed on a lower edge of the door aperture 3.

The vehicle door opening and closing apparatus, according to exemplary embodiments of the present disclosure, may include roller units 21 and 22 guided along the rails 11 and 12. The roller units 21 and 22 may allow the vehicle door 5 to open and close in one mode selected from the sliding mode and the swing mode. In particular, the roller units 21 and 22 may be releasably held in predetermined positions of the rails 11 and 12 by hold locks 31 and 32. Specifically, when the roller units 21 and 22 are held in the predetermined positions of the rails 11 and 12 by the hold locks 31 and 32, the vehicle door 5 may be opened and closed in the swing mode in which the vehicle door swings in the predetermined positions of the rails 11 and 12. When the roller units 21 and 22 are released by the hold locks 31 and 32, the vehicle door 5 may be opened and closed in the sliding mode in which the vehicle door slides along the rails 11 and 12.

The vehicle door opening and closing apparatus, according to exemplary embodiments of the present disclosure, may further include the center rail 13 mounted on a central portion of the vehicle, and a center roller unit 23 guided along the center rail 13.

Figure 3:
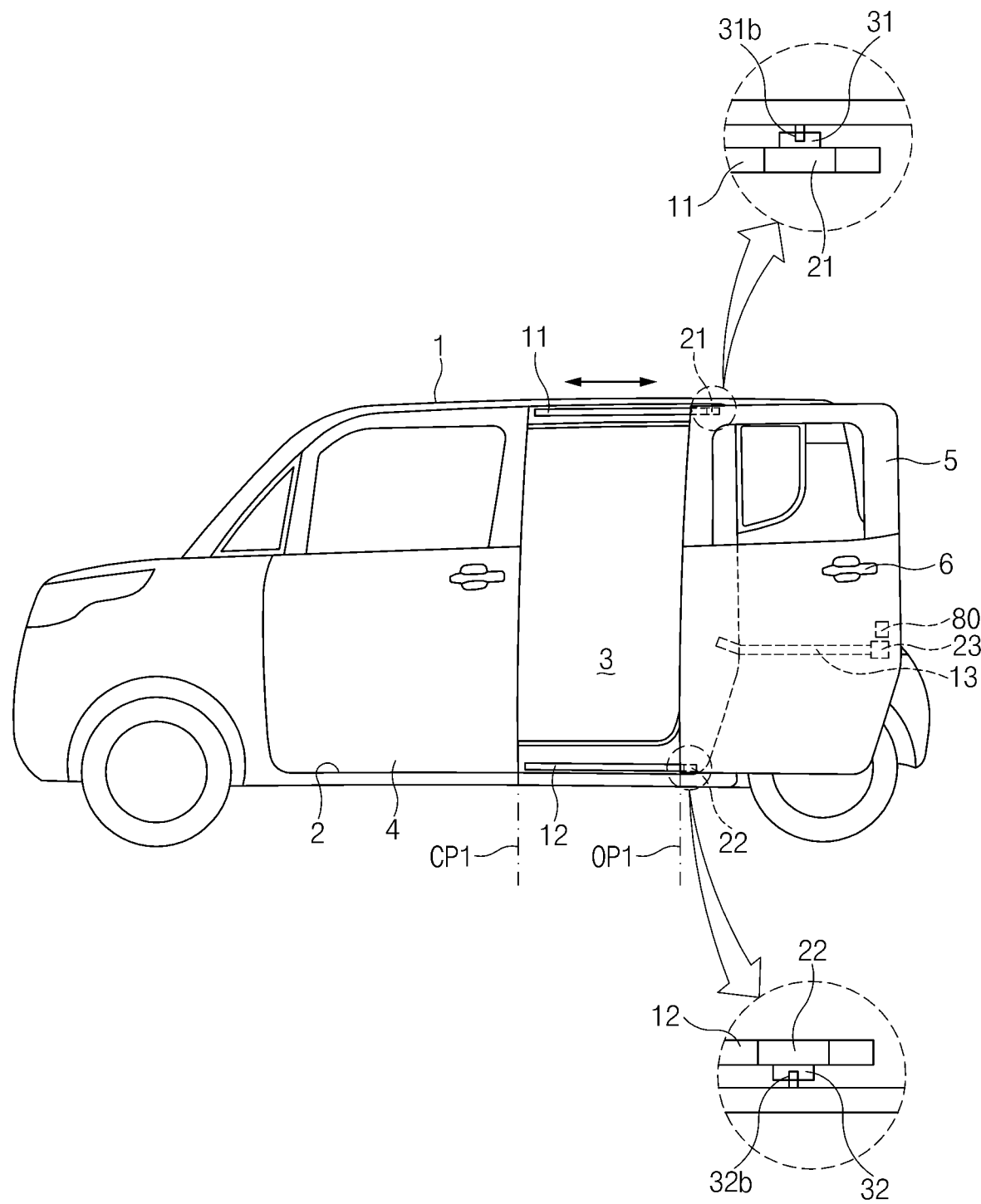
FIG. 3 illustrates a state in which the door of FIG. 1 is opened in a sliding mode.

Referring to FIGS. 1 and 3, the upper roller unit 21 may be mounted on an upper end of the vehicle door 5, and the upper roller unit 21 may slide along the upper rail 11. The lower roller unit 22 may be mounted on a lower end of the vehicle door 5, and the lower roller unit 22 may slide along the lower rail 12.

Figure 2:
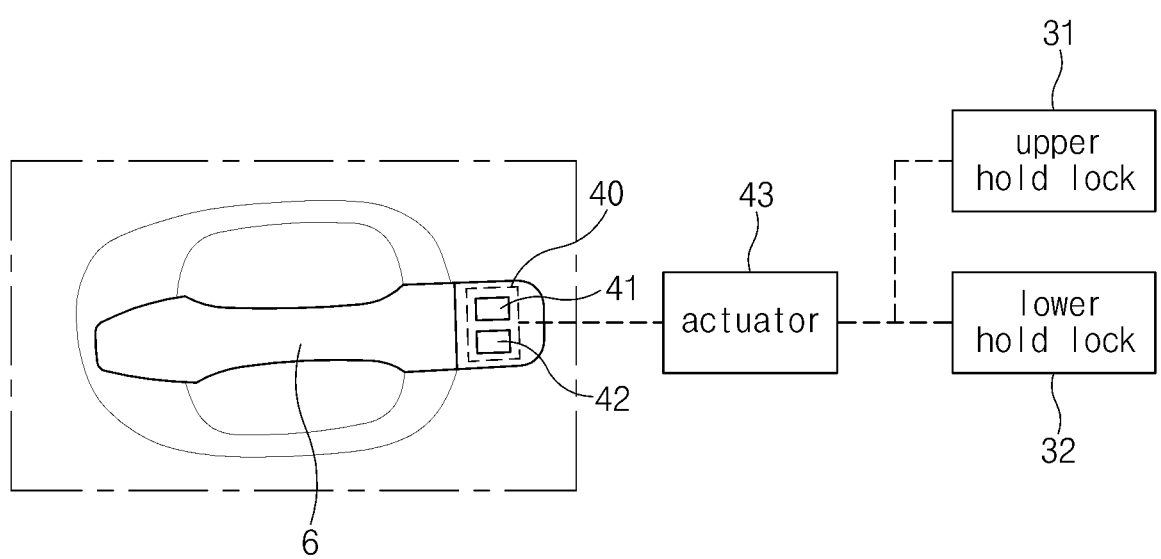
FIG. 2 illustrates a selector adjacent to an outside handle of a vehicle, an actuator connected to the selector, and hold locks.

Referring to FIG. 2, the vehicle door 5 may include an outside handle 6, and a selector 40 for selecting the sliding mode and the swing mode may be disposed on the outside handle 6 or a portion of the vehicle door adjacent to the outside handle 6. The selector 40 may have a first switch 41 selecting the sliding mode, and a second switch 42 selecting the swing mode.

When a user presses the first switch 41 and the sliding mode is selected, the vehicle door 5 may slide along the upper rail 11, the lower rail 12, and a center rail 13 as illustrated in FIG. 3 as the user pushes the outside handle 6 toward the front of the vehicle or pulls the outside handle 6 toward the rear of the vehicle. In the sliding mode, the vehicle door 5 may move between a first open position OP1 in which the vehicle door 5 is fully opened and a first closed position CP1 in which the vehicle door 5 is fully closed, as illustrated in FIGS. 1 and 3.

Figure 4:
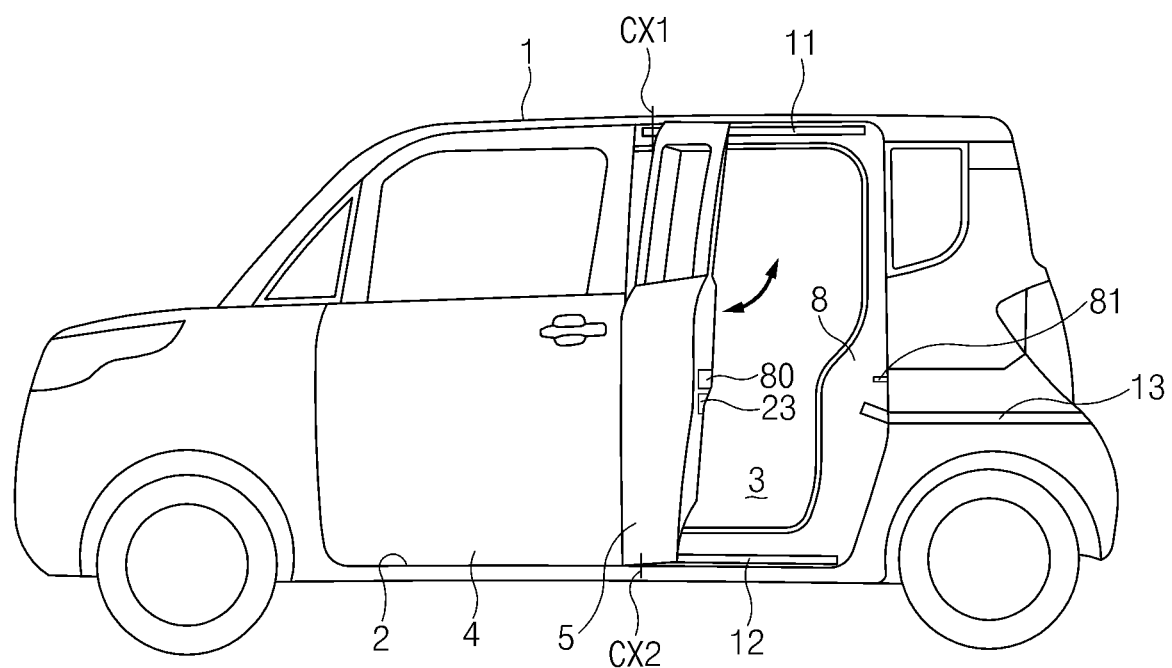
FIG. 4 illustrates a state in which the door of FIG. 1 is opened in a swing mode.
Figure 6:
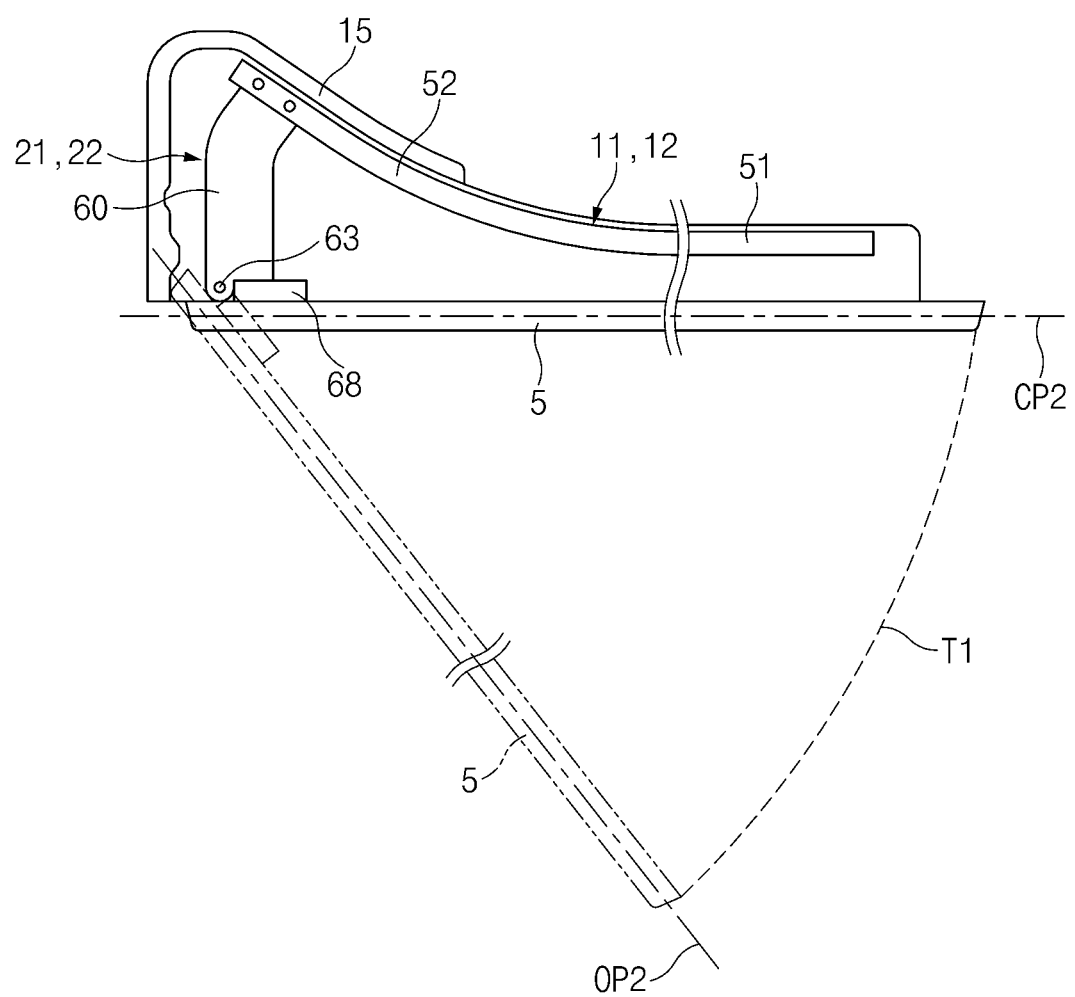
FIG. 6 illustrates a state in which a vehicle door pivots by an upper roller unit and a lower roller unit when the vehicle door is opened and closed in a swing mode in a vehicle door opening and closing apparatus according to an exemplary embodiment of the present disclosure.

When the user presses the second switch 42 and the swing mode is selected, the vehicle door 5 may swing as illustrated in FIG. 4 as the user pushes or pulls the outside handle 6 toward a passenger compartment of the vehicle or toward the exterior of the vehicle. In the swing mode, the vehicle door 5 may move between a second open position OP2 in which the vehicle door 5 is fully opened and a second closed position CP2 in which the vehicle door 5 is fully closed, as illustrated in FIG. 6. The vehicle door 5 swings from the second closed position CP2 to the second open position OP2 along a swing trajectory T1. In particular, when the vehicle door 5 is held in the first closed position CP1, the swing mode may be operated.

The upper roller unit 21 may have an upper hold lock 31, and the vehicle body 1 may have a first upper striker 31a and a second upper striker 31b protruding downwardly from a top portion of the vehicle body 1. The first upper striker 31a may be aligned with or adjacent to a virtual axis of the first closed position CP1, and the second upper striker 31b may be aligned with or adjacent to a virtual axis of the first open position OP1.

According to an exemplary embodiment, as illustrated in FIGS. 1 and 3, the upper hold lock 31 may releasably hold the first upper striker 31a in the first closed position CP1, and releasably hold the second upper striker 31b in the first open position OP1. That is, one upper hold lock 31 may selectively hold the first upper striker 31a and the second upper striker 31b. As the upper hold lock 31 holds the first upper striker 31a, the upper roller unit 21 may be firmly held in the first closed position CP1 so that the vehicle door 5 may be kept in the first closed position CP1. As the upper hold lock 31 holds the second upper striker 31b, the upper roller unit 21 may be firmly held in the first open position OP so that the vehicle door 5 may be kept in the first open position OP1.

Figure 7:
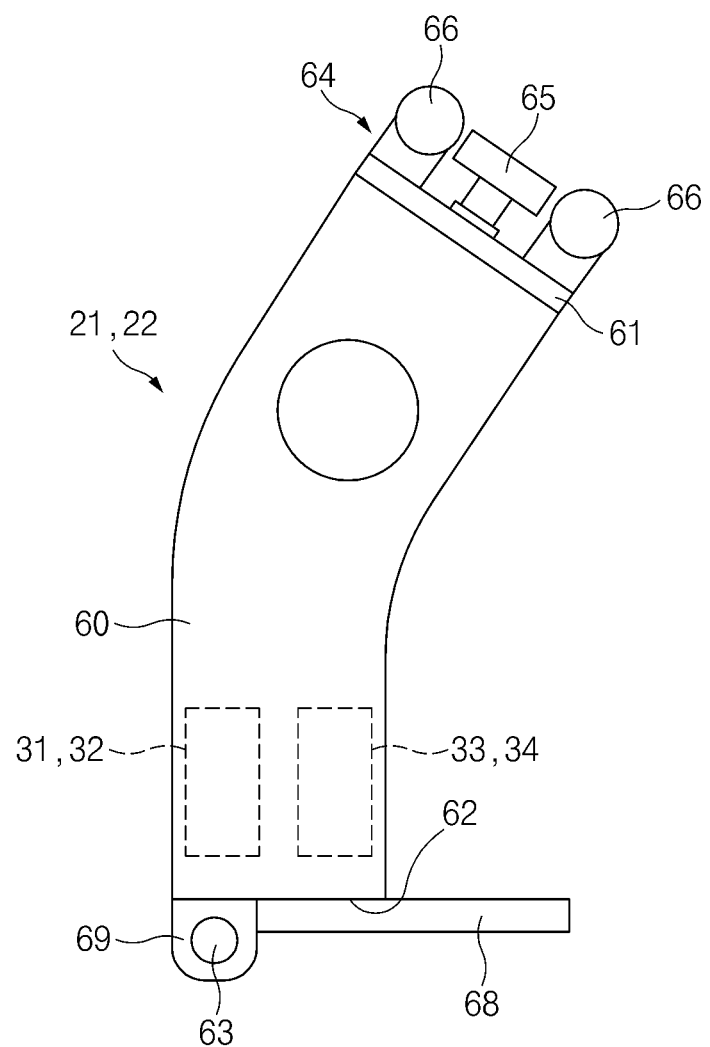
FIG. 7 illustrates an upper roller unit and a lower roller unit in a vehicle door opening and closing apparatus according to an exemplary embodiment of the present disclosure.

According to another exemplary embodiment, the upper hold lock 31 may releasably hold the first upper striker 31a in the first closed position CP1 so that the vehicle door 5 may be kept in the first closed position CP1. That is, the upper hold lock 31 may be an upper closed hold lock which keeps the closed state of the vehicle door 5 in the first closed position CP1. Referring to FIG. 7, an upper open hold lock 33 may be mounted on the upper roller unit 21, and the upper open hold lock 33 may releasably hold the second upper striker 31b in the first open position OP1. That is, the upper closed hold lock 31, which releasably holds the first upper striker 31a in the first closed position CP1, and the upper open hold lock 33, which releasably holds the second upper striker 31b in the first open position OP1, may be individually mounted on the upper roller unit 21.

Referring to FIG. 4, the upper roller unit 21 may have an upper rotation axis CX1, and the vehicle door 5 may rotate around the upper rotation axis CX. When the upper roller unit 21 is firmly held in the first closed position CP1 by the upper hold lock 31 and the first upper striker 31a, the vehicle door 5 may rotate around the upper rotation axis CX1.

The lower roller unit 22 may have a lower hold lock 32, and the vehicle body 1 may have a first lower striker 32a and a second lower striker 32b protruding upwardly from a floor of the vehicle body 1. The first lower striker 32a may be aligned with or adjacent to the virtual axis of the first closed position CP1, and the second lower striker 32b may be aligned with or adjacent to the virtual axis of the first open position OP1.

According to an exemplary embodiment, as illustrated in FIGS. 1 and 3, the lower hold lock 32 may releasably hold the first lower striker 32a in the first closed position CP1, and releasably hold the second lower striker 32b in the first open position OP1. That is, one lower hold lock 32 may selectively hold the first lower striker 32a and the second lower striker 32b. As the lower hold lock 32 holds the first lower striker 32a, the lower roller unit 22 may be firmly held in the first closed position CP1 so that the vehicle door 5 may be kept in the first closed position CP1. As the lower hold lock 32 holds the second lower striker 32b, the lower roller unit 22 may be firmly held in the first open position OP so that the vehicle door 5 may be kept in the first open position OP1.

According to another exemplary embodiment, the lower hold lock 32 may releasably hold the first lower striker 32a in the first closed position CP1 so that the vehicle door 5 may be kept in the first closed position CP1. That is, the lower hold lock 32 may be a lower closed hold lock which keeps the closed state of the vehicle door 5 in the first closed position CP1. Referring to FIG. 7, a lower open hold lock 34 may be mounted on the lower roller unit 22, and the lower open hold lock 34 may releasably hold the second lower striker 32b in the first open position OP1. That is, the lower closed hold lock 32, which releasably holds the first lower striker 32a in the first closed position CP1, and the lower open hold lock 34, which releasably holds the second lower striker 32b in the first open position OP1, may be individually mounted on the lower roller unit 22.

According to an exemplary embodiment, the vehicle door 5 may be releasably held in the first closed position CP1 by the upper hold lock 31 and the lower hold lock 32 so that the vehicle door 5 may be kept in the first closed position CP1 by the upper hold lock 31 and the lower hold lock 32. That is, the upper hold lock 31 and the lower hold lock 32 may function as the closed hold lock which holds the vehicle door 5 in the first closed position CP1.

Referring to FIG. 4, the lower roller unit 22 may have a lower rotation axis CX2, and the vehicle door 5 may rotate around the lower rotation axis CX2. When the lower roller unit 22 is firmly held in the first closed position CP1 by the lower hold lock 32 and the first lower striker 32a, the vehicle door 5 may rotate around the lower rotation axis CX2.

As illustrated in FIG. 4, the upper rotation axis CX1 and the lower rotation axis CX2 may be vertically aligned, such as being collinear, and the vehicle door 5 may rotate around the vertically aligned upper and lower rotation axes CX1 and CX2.

Referring to FIG. 2, the selector 40 may be electrically connected to an actuator 43, and the actuator 43 may be configured to operate the upper hold lock 31 and the lower hold lock 32.

As the user selects the selector 40, the actuator 43 may selectively perform a hold operation in which the upper hold lock 31 holds the first upper striker 31a and the lower hold lock 32 holds the first lower striker 32a, and a release operation in which the upper hold lock 31 releases the first upper striker 31a and the lower hold lock 32 releases the first lower striker 32a.

When the user presses the first switch 41 of the selector 40 in a state in which the vehicle door 5 is closed, the upper hold lock 31 may release the first upper striker 31a and the lower hold lock 32 may release the first lower striker 32a simultaneously by the release operation of the actuator 43. Thus, the user may slide the vehicle door 5 in the longitudinal direction of the vehicle body 1 so that the vehicle door 5 may be opened and closed in the sliding mode.

When the user presses the second switch 42 of the selector 40 in a state in which the vehicle door 5 is closed, the upper hold lock 31 may hold the first upper striker 31a and the lower hold lock 32 may hold the first lower striker 32a simultaneously by the hold operation of the actuator 43, and the upper roller unit 21 and the lower roller unit 22 may be firmly held in the first closed position CP1. Thus, the user may swing the vehicle door 5 toward an interior space and an exterior space of the vehicle so that the vehicle door 5 may be opened and closed in the swing mode.

According to an exemplary embodiment, as illustrated in FIG. 2, one actuator 43 may operate the upper hold lock 31 and the lower hold lock 32 simultaneously.

According to another exemplary embodiment, an upper actuator operating the upper hold lock 31 and a lower actuator operating the lower hold lock 32 may be individually connected to the selector 40.

FIGS. 9A to 9D illustrate the upper hold lock 31 and the lower hold lock 32 according to an exemplary embodiment of the present disclosure. Referring to FIGS. 9A to 9D, each of the upper hold lock 31 and the lower hold lock 32 may include a catch 71, a pawl 72 releasably engaging with the catch 71, and a lever 73 operatively connected to the pawl 72. The lever 73 may be connected to the actuator 43 through a cable 75. As the cable 75 is reversed (pulled) by the actuator 43, the catch 71 may release the strikers 31a and 32a. A portion of the catch 71, the pawl 72, and the lever 73 may be covered by a cover plate 76, and the cover plate 76 may be attached to a mounting plate 74. The strikers 31a and 32a may be fixed to the vehicle body 1 by a mounting plate 78.

Referring to FIGS. 9A to 9D, the upper hold lock 31 may releasably hold the first upper striker 31a, and the lower hold lock 32 may releasably hold the first lower striker 32a.

Figure 9A:
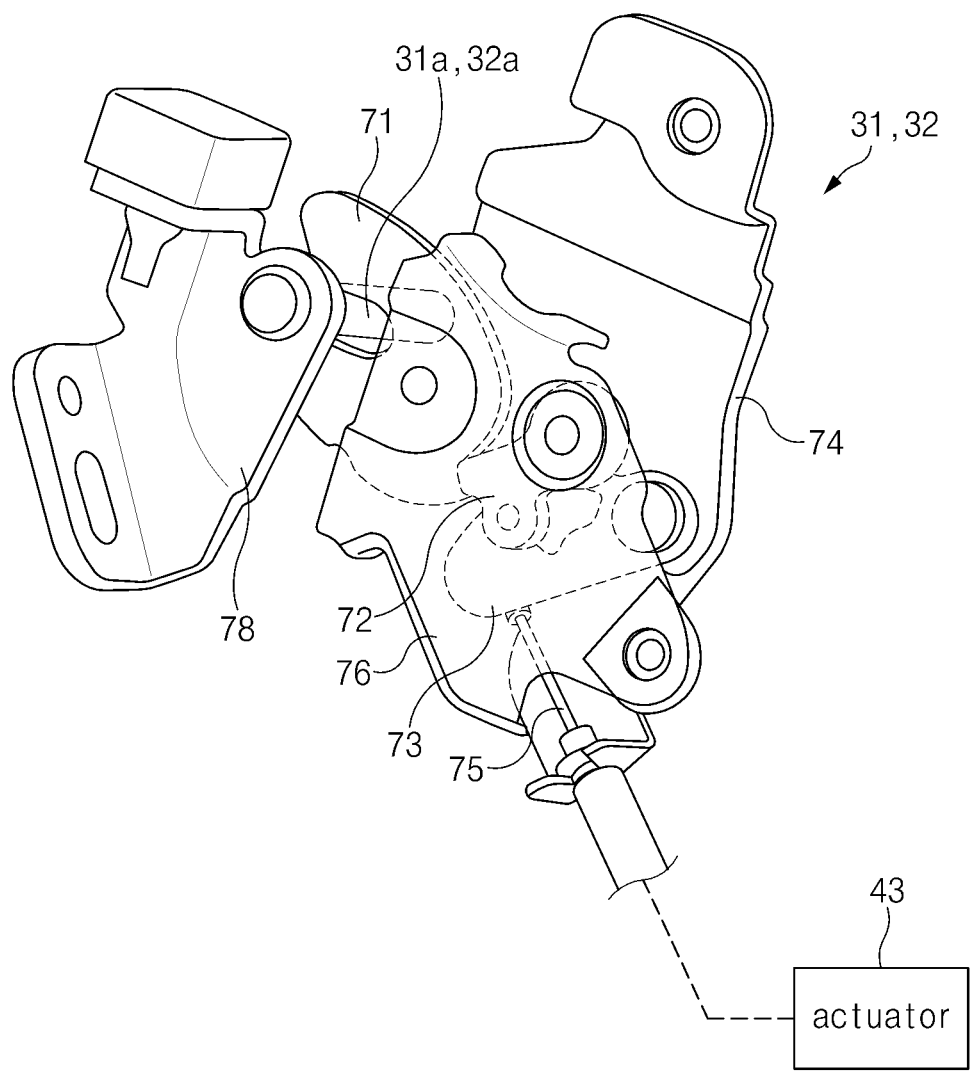
FIG. 9A illustrates a perspective view of an upper hold lock and a lower hold lock.
Figure 9B:
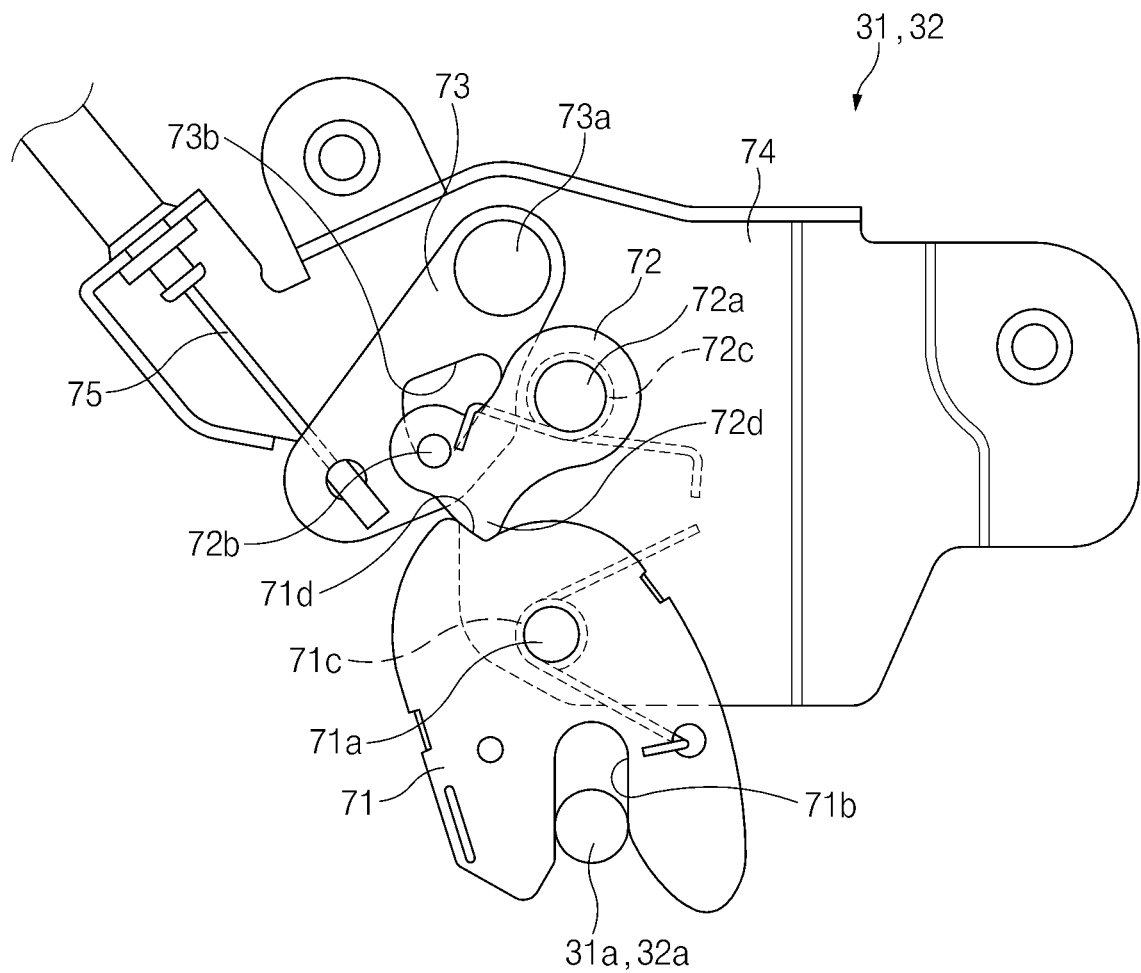
FIG. 9B illustrates a state in which an upper hold lock and a lower hold lock hold corresponding strikers.
Figure 9C:
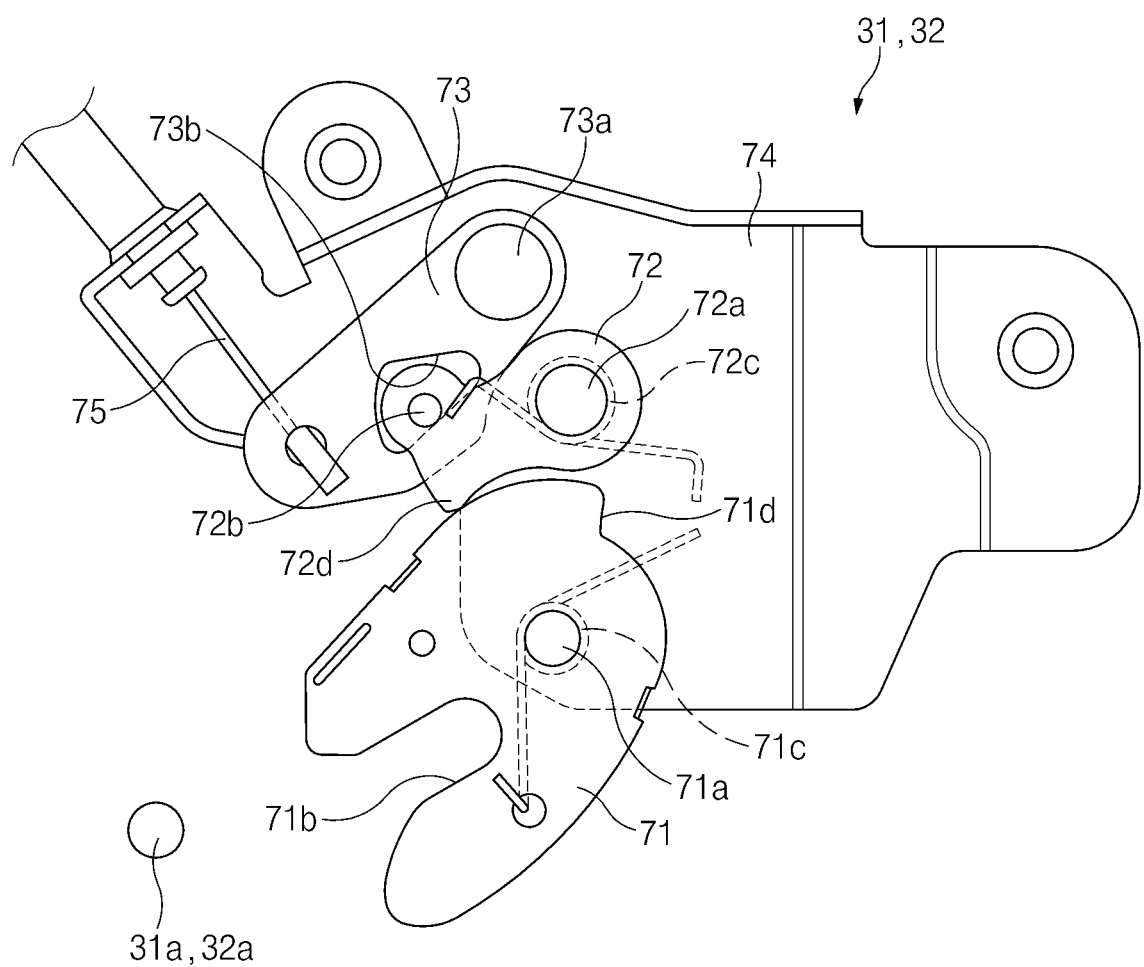
FIG. 9C illustrates a state in which an upper hold lock and a lower hold lock release corresponding strikers.

The catch 71 may be pivotally mounted on the mounting plate 74 through a first pivot shaft 71a. The catch 71 may have a slot 71b receiving the strikers 31a and 32a, and the catch 71 may engage with or release the strikers 31a and 32a. The catch 71 may move between an engaging position (see FIG. 9B) and a release position (see FIG. 9C). The engaging position refers to a position in which the catch 71 engages with the strikers 31a and 32a as illustrated in FIG. 9B, and the release position refers to a position in which the catch 71 releases the strikers 31a and 32a as illustrated in FIG. 9C. When the catch 71 is in the engaging position as illustrated in FIG. 9B, the catch 71 may engage with the strikers 31a and 32a so that the catch 71 may hold the strikers 31a and 32a. When the catch 71 is in the release position as illustrated in FIG. 9C, the catch 71 may release the strikers 31a and 32a. Thus, the strikers 31a and 32a may be released from the slot 71b of the catch 71 or be received in the slot 71b of the catch 71. The catch 71 may be biased toward the release position by a first biasing element 71c such as a torsion spring. The first biasing element 71c may be disposed around the first pivot shaft a. The catch 71 may have a locking shoulder 71d.

Figure 9D:
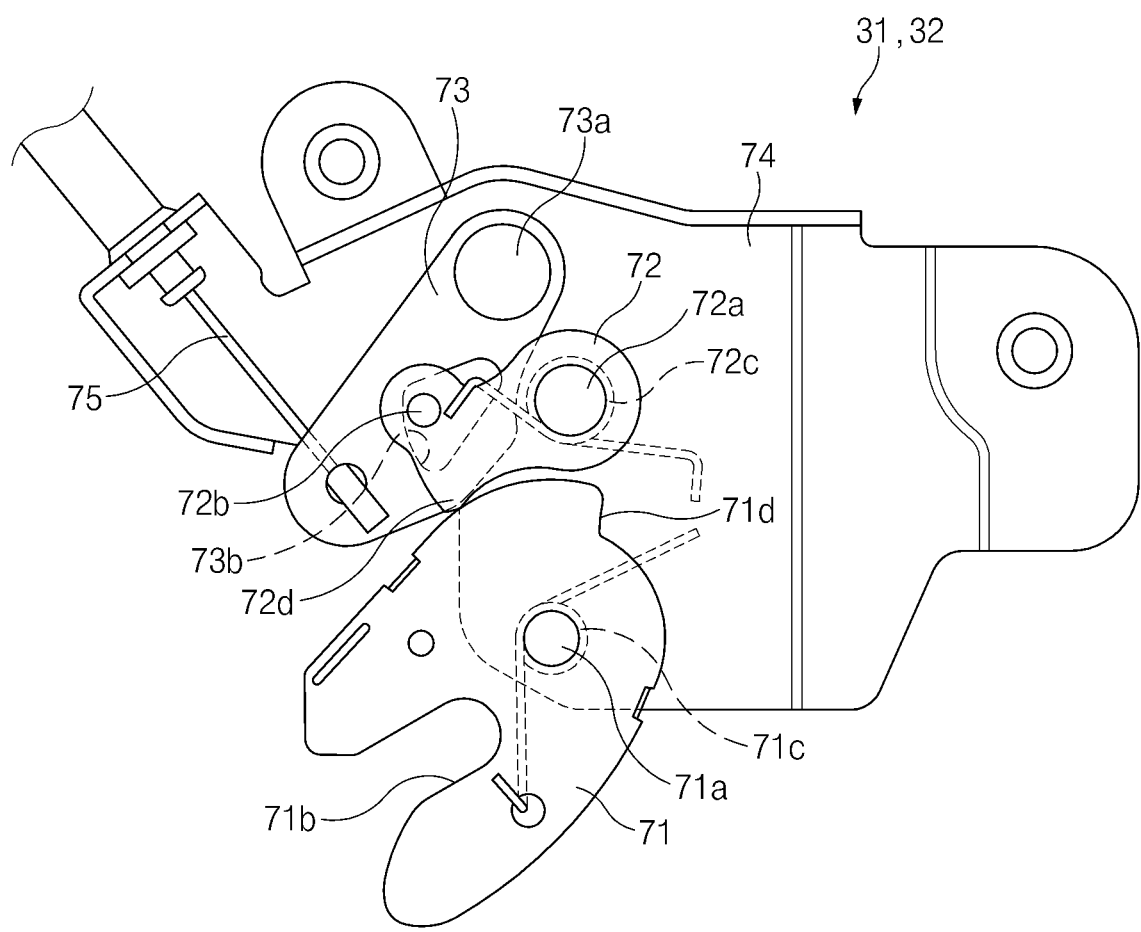
FIG. 9D illustrates a state in which an upper hold lock and a lower hold lock are allowed to receive corresponding strikers.

The pawl 72 may be pivotally mounted on the mounting plate 74 through a second pivot shaft 72a, and the pawl 72 may move between a pawl locking position (see FIG. 9B) and a pawl release position (see FIGS. 9C and 9D). The pawl locking position refers to a position in which the pawl 72 engages with the catch 71 and the catch 71 is kept in the engaging position, and the pawl release position refers to a position in which the pawl 72 releases the catch 71 and the catch 71 is allowed to move from the engaging position to the release position. As illustrated in FIG. 9B, when the pawl 72 is in the pawl locking position, the movement (rotation) of the catch 71 may be restricted by the pawl 72 so that the catch 71 may be kept in the engaging position. As illustrated in FIGS. 9C and 9D, when the pawl 72 is in the pawl release position, the movement (rotation) of the catch 71 may not be restricted by the pawl 72 so that the catch 71 may move from the engaging position to the release position. The pawl 72 may be biased toward the pawl locking position (see FIG. 9B) by a second biasing element 72c such as a torsion spring. The second biasing element 72c may be disposed around the second pivot shaft 72a.

The pawl 72 may have a locking projection 72d engageable with the locking shoulder 71d of the catch 71. As illustrated in FIG. 9B, as the pawl 72 is moved to the pawl locking position by the second biasing element 72c, the locking projection 72d of the pawl 72 may engage with the locking shoulder 71d of the catch 71 so that the movement (rotation) of the catch 71 may be restricted, and accordingly the catch 71 may be kept in the engaging position. As illustrated in FIG. 9C, as the pawl 72 is moved to the pawl release position by the lever 73, the locking projection 72d of the pawl 72 may be released from the locking shoulder 71d of the catch 71 so that the movement (rotation) of the catch 71 may be allowed, and accordingly the catch 71 may be moved to the release position by the first biasing element 71c.

The lever 73 may be pivotally mounted on the mounting plate 74 through a third pivot shaft 73a. The lever 73 may be connected to the actuator 43 through the cable 75. An end of the cable 75 may be fixed to the lever 73, and the cable 75 may be advanced or reversed by the actuator 43. As the actuator 43 moves the cable 75, the lever 73 may pivot around the third pivot shaft 73a. As the cable 75 is reversed, the lever 73 may move the pawl 72 to the pawl release position (see FIG. 9C).

The lever 73 may be operatively connected to the pawl 72 through a pin 72b and an opening 73b. The pin 72b may be provided on the pawl 72, and the opening 73b may be provided in the lever 73. The pin 72b may be movably received in the opening 73b. As the lever 73 pivots around the third pivot shaft 73a, the pin 72b may move in the opening 73b, allowing the pawl 72 to move.

As illustrated in FIG. 9B, when the cable 75 is advanced by the actuator 43, the locking projection 72d of the pawl 72 may engage with the locking shoulder 71d of the catch 71 so that the movement (rotation) of the catch 71 may be restricted. Accordingly, the catch 71 may be kept in the engaging position, and the strikers 31a and 32a may be held in the slot 71b of the catch 71. That is, the upper hold lock 31 and the lower hold lock 32 may hold the corresponding strikers 31a and 32a.

As illustrated in FIG. 9C, when the cable 75 is reversed by the actuator 43, the lever 73 may move the pawl 72 to the pawl release position. The locking projection 72d of the pawl 72 may be released from the locking shoulder 71d of the catch 71 so that the movement (rotation) of the catch 71 may be allowed. Accordingly, the catch 71 may be moved to the release position by the first biasing element 71c, and the strikers 31a and 32a may be released from the slot 71b of the catch 71. Thus, the upper hold lock 31 and the lower hold lock 32 may release the corresponding strikers 31a and 32a, and the upper roller unit 21 and the lower roller unit 22 may slide along the upper rail 11 and the lower rail 12.

As illustrated in FIG. 9D, even when the cable 75 is advanced by the actuator 43 in a state in which the locking projection 72d of the pawl 72 is released from the locking shoulder 71d of the catch 71, the catch 71 may be kept in the release position by the first biasing element 71c so that the movement (rotation) of the catch 71 may be allowable. In this state, the strikers 31a and 32a may be allowed to be received in the slot 71b of the catch 71. That is, in a state in which the movement (rotation) of the catch 71 is allowable as the locking projection 72d of the pawl 72 is released from the locking shoulder 71d of the catch 71, when the upper roller unit 21 and the lower roller unit 22 slide between the first closed position CP1 and the first open position OP1, the strikers 31a and 32a may be allowed to be received in the slot 71b of the catch 71. When an external force applied through the upper hold lock 31 and the lower hold lock 32 in a state in which the strikers 31a and 32a are received in the slot 71b of the catch 71 is greater than a spring force of the first biasing element 71c, the catch 71 may be moved to the engaging position. As illustrated in FIG. 9B, as the locking projection 72d of the pawl 72 engages with the locking shoulder 71d of the catch 71, the catch 71 may hold the strikers 31a and 32a.

Figure 5:
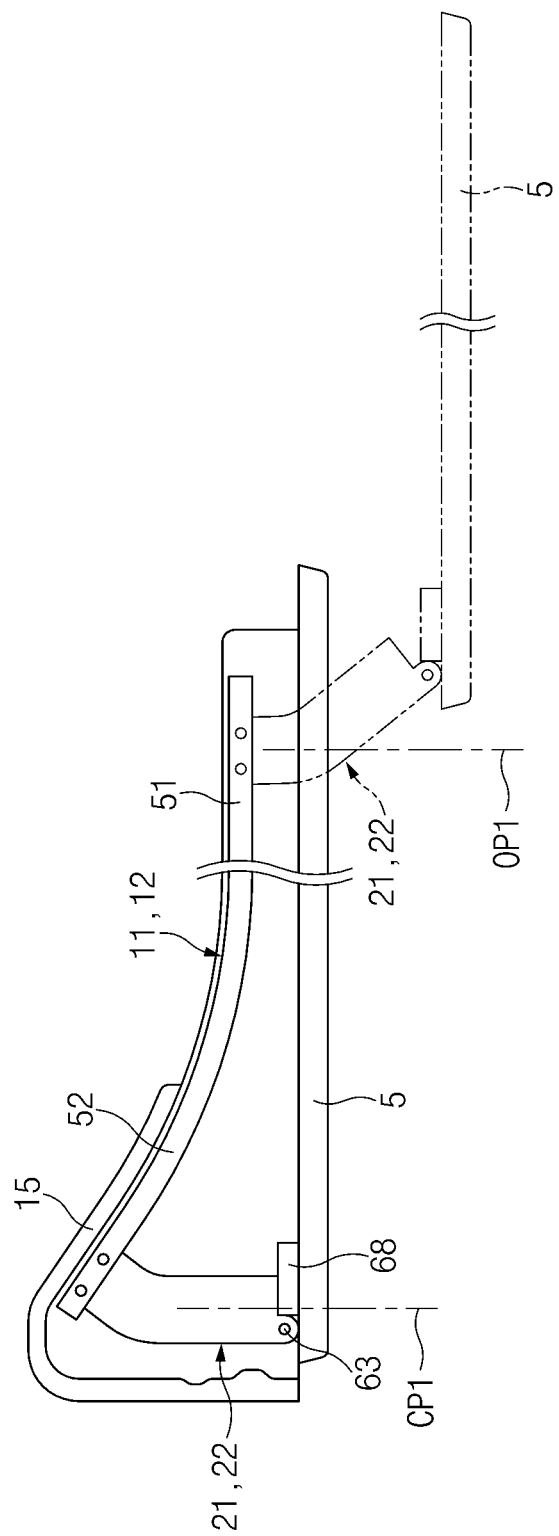
FIG. 5 illustrates a state in which an upper roller unit and a lower roller unit move along an upper rail and a lower rail when a vehicle door is opened and closed in a sliding mode in a vehicle door opening and closing apparatus according to an exemplary embodiment of the present disclosure.

Referring to FIG. 5, each of the upper rail 11 and the lower rail 12 may be mounted on the vehicle body 1 through a mounting bracket 15, and the mounting bracket 15 may have a shape corresponding to that of the upper rail 11 and the lower rail 12. Each of the upper rail 11 and the lower rail 12 may have a first extension portion 51 extending straightly in the longitudinal direction of the vehicle, and a second extension portion 52 extending from the first extension portion 51 toward the interior space of the vehicle. The second extension portion 52 may be bent with respect to the first extension portion 51 at a predetermined angle.

Figure 8:
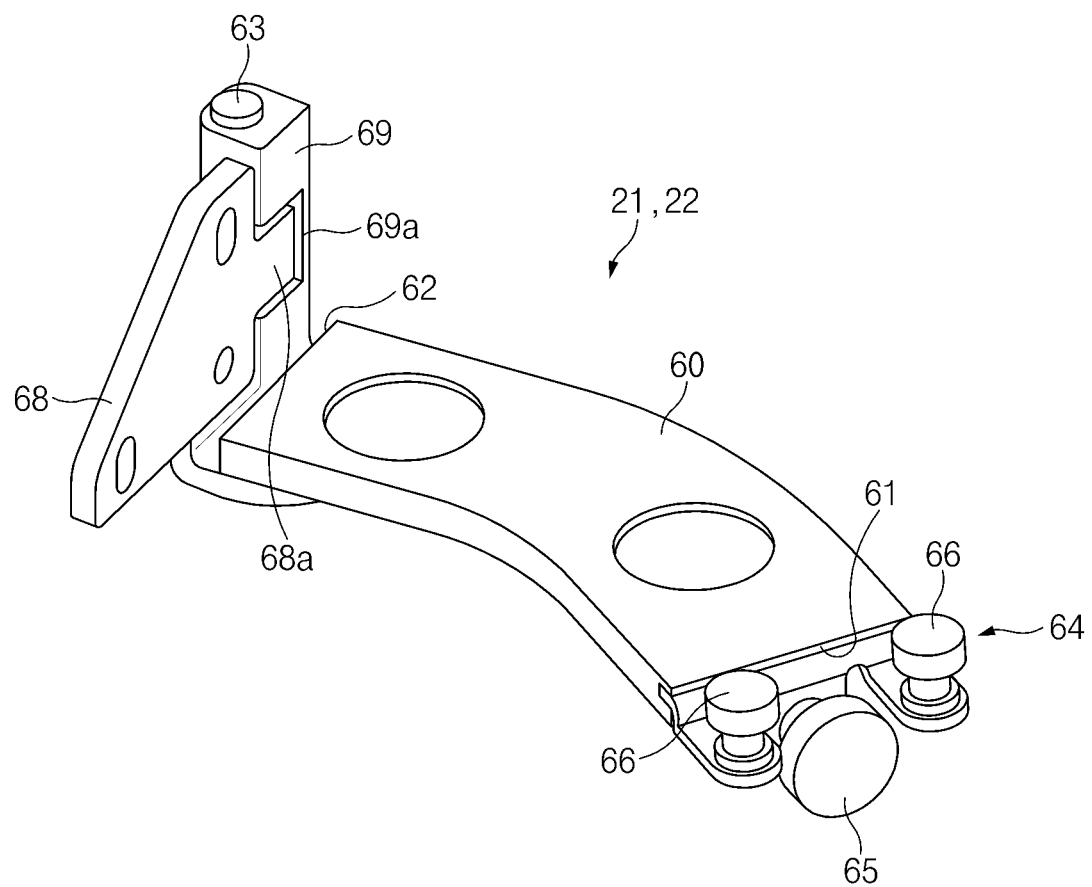
FIG. 8 illustrates a perspective view of an upper roller unit and a lower roller unit in a vehicle door opening and closing apparatus according to an exemplary embodiment of the present disclosure.

Referring to FIGS. 7 and 8, each of the upper roller unit 21 and the lower roller unit 22 may include a roller bracket 64 having rollers 65 and 66 rolling along the rails 11 and 12, and a body 60 connecting the roller bracket 64 and the vehicle door 5.

The roller bracket 64 may rotatably support the rollers 65 and 66, and the rollers 65 and 66 may roll along the upper rail 11 and the lower rail 12. As illustrated in FIG. 8, a middle roller 65 and two side rollers 66 disposed on both sides with respect to the middle roller 65 may be rotatably mounted on the roller bracket 64. A rotation axis of the middle roller 65 may be perpendicular to a rotation axis of the side roller 66.

The body 60 may be curved so as not to interfere with the first extension portion 51 and the second extension portion 52. The body 60 may have a first end portion 61 facing the interior of the vehicle, and a second end portion 62 facing the exterior of the vehicle. The first end portion 61 of the body 60 may be fixed to the roller bracket 64 using fasteners, welding, and/or the like, and the second end portion 62 of the body 60 may be pivotally connected to the vehicle door 5 through a pivot pin 63. The vehicle door 5 may swing around the pivot pin 63 adjacent to the second end portion 62 of the body 60.

Referring to FIGS. 7 and 8, the roller bracket 64 may be directly fixed to the first end portion 61 of the body 60 using fasteners, welding, and/or the like, and the second end portion 62 of the body 60 may be pivotally connected to the vehicle door 5 through the pivot pin 63. A first pivot bracket 68 may be fixed to the vehicle door 5 using fasteners, welding, and/or the like, and a second pivot bracket 69 may be fixed to the second end portion 62 of the body 60 using fasteners, welding, and/or the like. The first pivot bracket 68 may have a lug 68a, and the second pivot bracket 69 may have a recess 69a. The lug 68a of the first pivot bracket 68 may be fitted into the recess 69a of the second pivot bracket 69, and the pivot pin 63 may extend through the lug 68a of the first pivot bracket 68 and the second pivot bracket 69. The upper rotation axis CX1 and the lower rotation axis CX2 may be defined by the pivot pin 63. For example, the upper rotation axis CX1 and the lower rotation axis CX2 may be a virtual axis extending vertically along a center point of the pivot pin 63, and the upper rotation axis CX1 and the lower rotation axis CX2 may be vertically aligned, and accordingly the vehicle door 5 may swing around the vertical rotation axis that virtually connects the upper rotation axis CX1 and the lower rotation axis CX2. The upper hold lock 31 may be fixed to the body 60 of the upper roller unit 21, and the lower hold lock 32 may be fixed to the body 60 of the lower roller unit 22.

When the upper hold lock 31 firmly holds the body 60 of the upper roller unit 21 in the first closed position CP1 and the lower hold lock 32 firmly holds the body 60 of the lower roller unit 22 in the first closed position CP1, the vehicle door 5 may swing around the upper rotation axis CX1 of the upper roller unit 21 and the lower rotation axis CX2 of the lower roller unit 22. Accordingly, the vehicle door 5 may move between the second closed position CP2 in which the vehicle door 5 is closed and the second open position OP2 in which the vehicle door 5 is opened.

Referring to FIG. 4, a main latch 80 may be mounted on a rear edge of the vehicle door 5, and a main striker 81 may be mounted on a peripheral face of the vehicle body 1 adjacent to a door frame area 8 of the vehicle body 1. The door frame area 8 refers to a frame area of the vehicle body 1 defining the door aperture 3. The main latch 80 may be located adjacent to the center roller unit 23, and the main striker 81 may be located adjacent to a front portion of the center rail 13.

Figure 10:
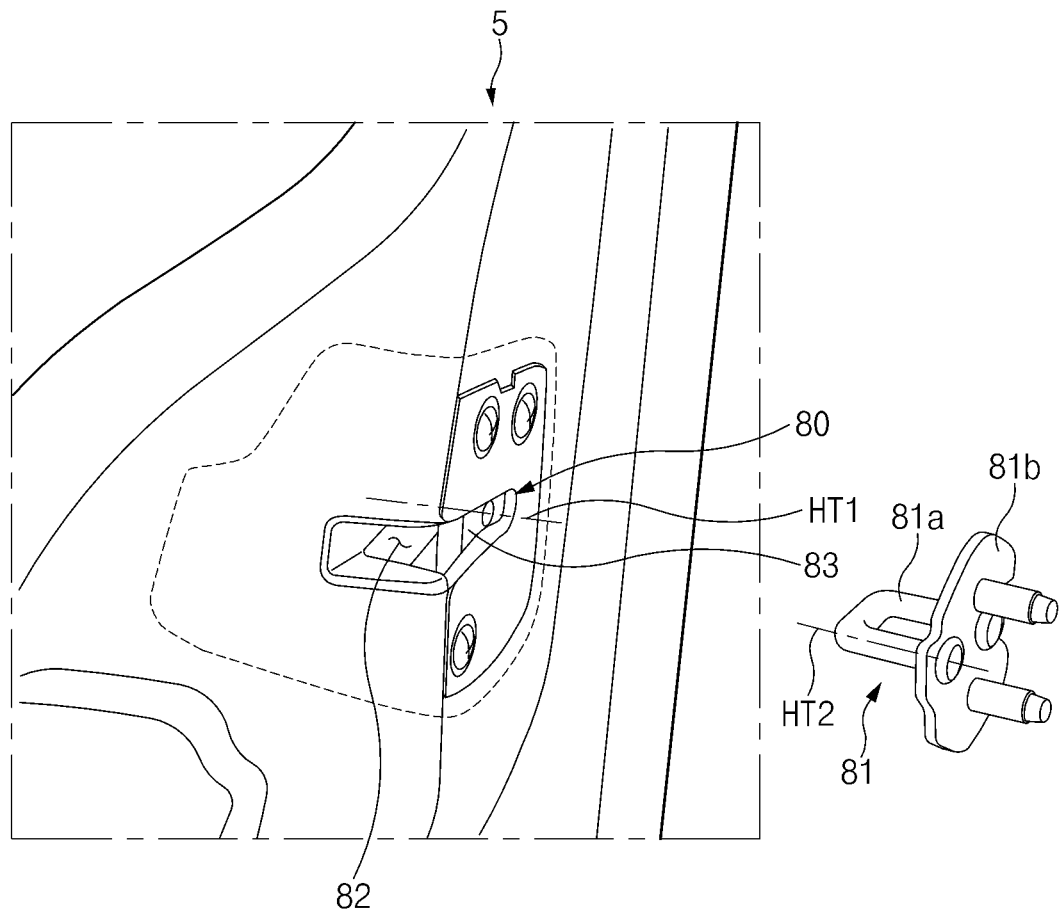
FIG. 10 illustrates a main latch mounted on a vehicle door and a main striker.

Referring to FIG. 10, the main latch 80 may be mounted on the rear edge of the vehicle door 5, and the main latch 80 may include a catch 83 rotatable around a rotation axis HT1 extending in the longitudinal direction of the vehicle. The main striker 81 may include a U-shaped rod 81a, and a base 81b fixed to the vehicle body 1. A slot 82 may be formed in the rear edge of the vehicle door 5, and the U-shaped rod 81a may be received in the slot 82 when the vehicle door 5 is closed. The U-shaped rod 81a may have a longitudinal axis HT2 extending in the longitudinal direction of the vehicle. The rotation axis HT1 of the catch 83 may be parallel to the longitudinal axis HT2 of the U-shaped rod 81a. In particular, the rotation axis HT1 of the catch 83 and the longitudinal axis HT2 of the U-shaped rod 81a may extend horizontally. The catch 83 of the main latch 80 may releasably engage with the rod 81a of the main striker 81. When the vehicle door 5 is in the first closed position CP1 or the second closed position CP2, the catch 83 of the main latch 80 may engage with the rod 81a of the main striker 81 by an engaging operation of the outside handle 6 so that the vehicle door 5 may be locked in the first closed position CP1 or the second closed position CP2. When the vehicle door 5 is in the first closed position CP1 or the second closed position CP2, the catch 83 of the main latch 80 may release the rod 81a of the main striker 81 by a release operation of the outside handle 6 so that the vehicle door 5 may be allowed to move in the sliding mode or the swing mode. When the vehicle door 5 is held in the first closed position CP1 and the catch 83 of the main latch 80 releases the rod 81a of the main striker 81, the center roller unit 23 may be released from the center rail 13, and thus the vehicle door 5 may be opened and closed in the swing mode.

Referring to FIGS. 1 and 3, the center rail 13 may extend along a center line of the vehicle body 1, and the center rail 13 may extend from a rear edge of the door aperture 3 in the longitudinal direction of the vehicle. The center roller unit 23 may be pivotally mounted on a central portion of the vehicle door 5. In particular, the center roller unit 23 may be mounted adjacent to a rear end of the vehicle door 5. The center roller unit 23 may be guided along the center rail 13.

Figure 11:
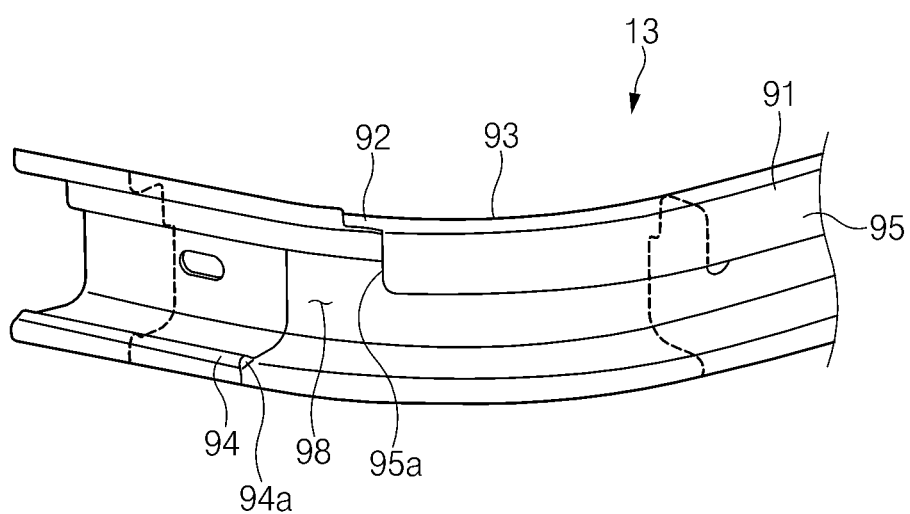
FIG. 11 illustrates a perspective view of a center rail in a vehicle door opening and closing apparatus according to an exemplary embodiment of the present disclosure.

Referring to FIG. 11, the center rail 13 may include a sliding guide 91 extending straightly in the longitudinal direction of the vehicle, and a swing guide 92 extending from the sliding guide 91 toward the interior of the vehicle. The swing guide 92 may be bent at a predetermined angle with respect to the sliding guide 91 through a bending portion 93, and the bending portion 93 may be curved at a predetermined radius.

Figure 12:
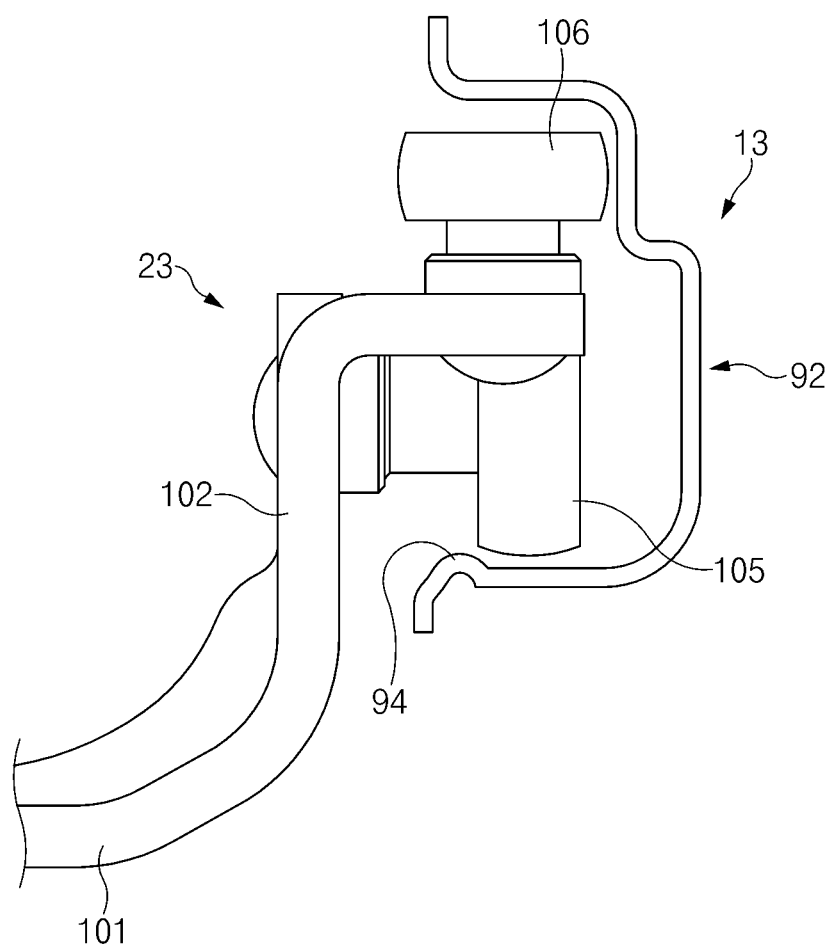
FIG. 12 illustrates a cross-sectional view of a swing guide of a center rail.
Figure 13:
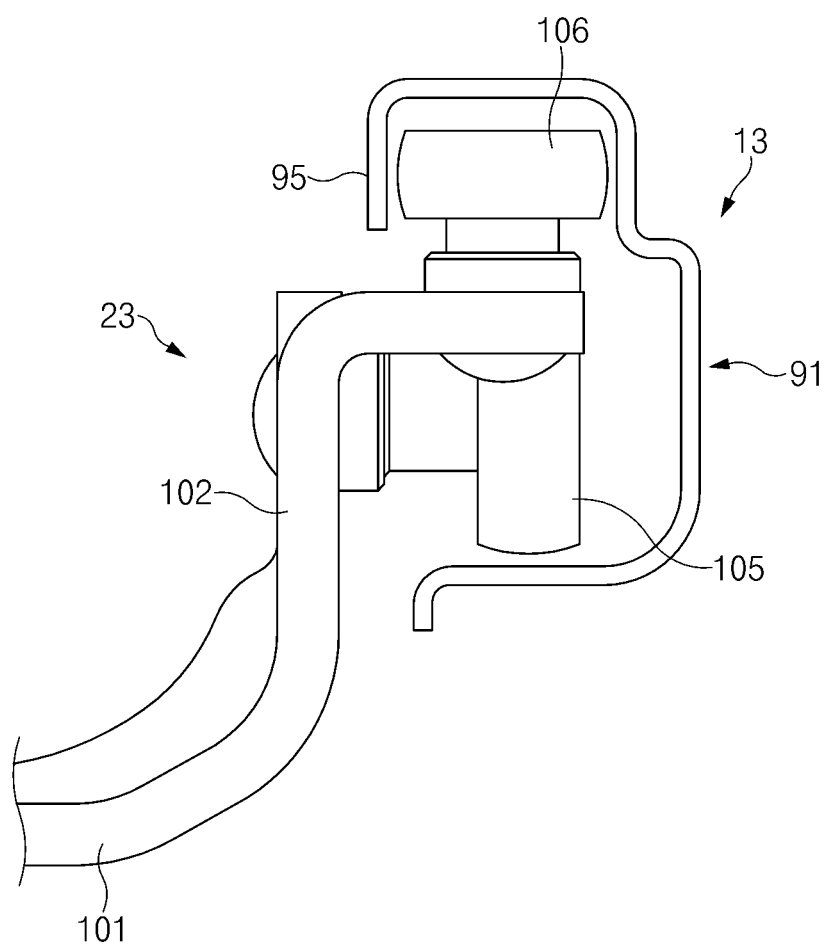
FIG. 13 illustrates a cross-sectional view of a sliding guide of a center rail.
Figure 14:
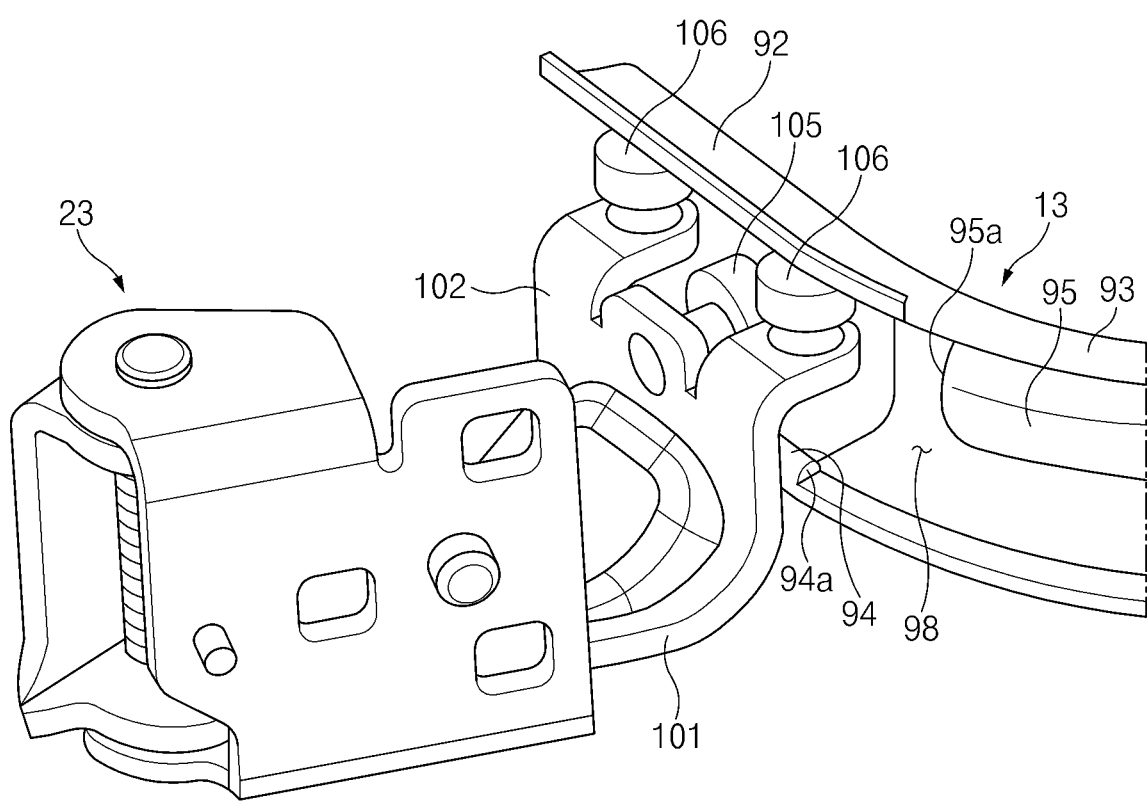
FIG. 14 illustrates a perspective view of a structure in which a center roller unit is held in a swing guide of a center rail.

Referring to FIGS. 12 to 14, the center roller unit 23 may include a roller bracket 101 and rollers 105 and 106 rotatably mounted on the roller bracket 101. The roller bracket 101 may include a first end portion adjacent to the center rail 13, and a second end portion relatively far from the center rail 13. The roller bracket 101 may be pivotally mounted on the central portion of the vehicle door 5, and the roller bracket 101 may include a roller arm 102 bent toward the center rail 13. The roller arm 102 may be bent from the first end portion of the roller bracket 101 at a predetermined angle. Specifically, the roller arm 102 may be perpendicular to the roller bracket 101. The plurality of rollers 105 and 106 may be rotatably mounted on the roller arm 102, and the plurality of rollers 105 and 106 may roll along the center rail 13. As illustrated in FIG. 14, a middle roller 105 and two side rollers 106 disposed on both sides of the middle roller 105 may be rotatably mounted on the roller arm 102 of the roller bracket 101. A rotation axis of the middle roller 105 may be perpendicular to a rotation axis of the side roller 106. The rollers 105 and 106 of the center roller unit 23 may be located on an upper portion of the center rail 13.

When the sliding mode is selected and the vehicle door 5 slides in the longitudinal direction of the vehicle, the sliding guide 91 may guide the rollers 105 and 106 of the center roller unit 23.

Referring to FIGS. 11 and 13, the sliding guide 91 may include a stopper wall 95 preventing the rollers 105 and 106 of the center roller unit 23 from being separated from the sliding guide 91. The sliding guide 91 may have an opening which is open to the exterior of the vehicle, and the stopper wall 95 may be located on an upper portion of the sliding guide 91. The stopper wall 95 may partially block an upper portion of the opening of the sliding guide 91 so that the sliding guide 91 may be partially opened to the exterior of the vehicle. In particular, the stopper wall 95 may be located to face the rollers 105 and 106 of the center roller unit 23 so that the stopper wall 95 may guide the movement of the rollers 105 and 106. The stopper wall 95 may extend along a length of the sliding guide 91 and a length of the bending portion 93. The stopper wall 95 may protrude vertically downward from an upper end of the sliding guide 91. As the stopper wall 95 closes the upper portion of the sliding guide 91 and an upper portion of the bending portion 93, the center roller unit 23 may be prevented from being separated from the sliding guide 91 as illustrated in FIG. 13.

When the swing mode is selected and the vehicle door 5 is opened and closed in the swing mode, the swing guide 92 may allow the rollers 105 and 106 of the center roller unit 23 to be released from the center rail 13.

The swing guide 92 may have an opening which is entirely open to the door aperture 3 and/or the exterior of the vehicle. A guide projection 94 may protrude upwardly from the bottom of the swing guide 92, and the guide projection 94 may extend along a length of the swing guide 92. When the vehicle door 5 swings from the second closed position CP2 to the second open position OP2 along the swing trajectory T1, the middle roller 105 of the center roller unit 23 may be guided along the guide projection 94 as illustrated in FIG. 12.

Figure 15:
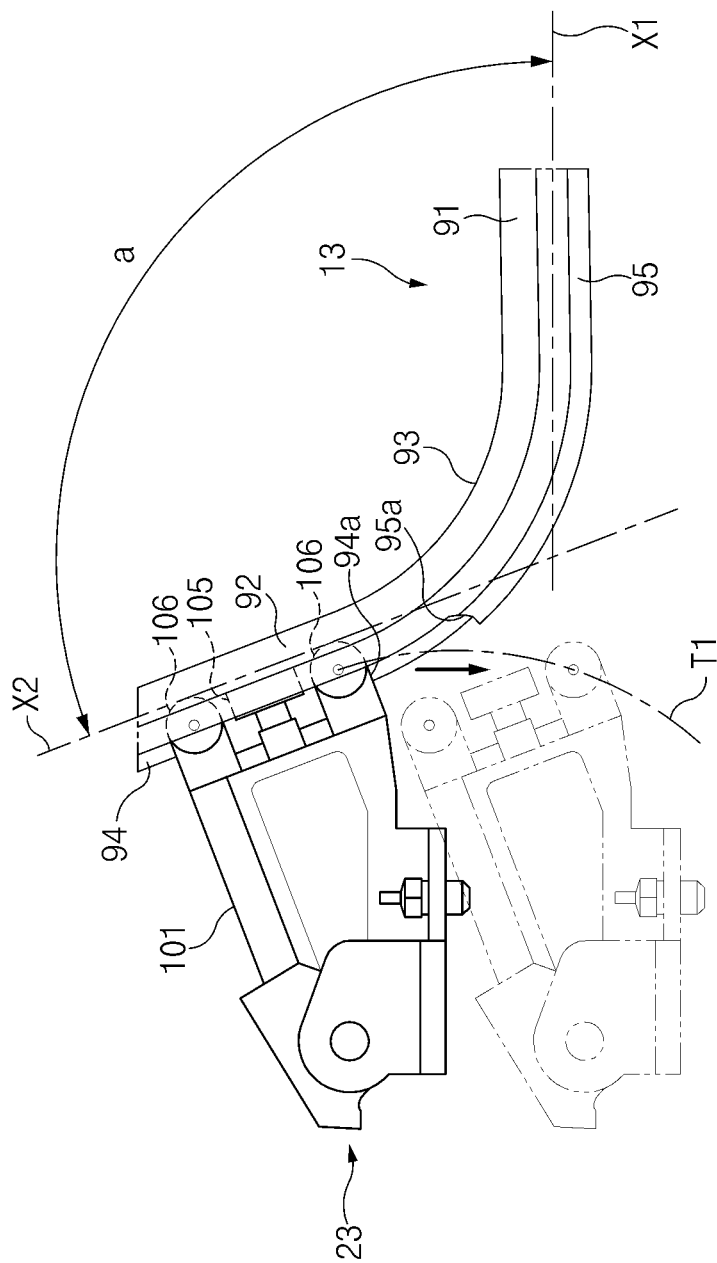
FIG. 15 illustrates a release operation in which a center roller unit is released from a swing guide of a center rail.

A front end 95a of the stopper wall 95 of the sliding guide 91 and a rear end 94a of the guide projection 94 may be located so as not to interfere with the swing trajectory T1 of the vehicle door 5. In addition, as illustrated in FIG. 15, an axis X1 of the sliding guide 91 and an axis X2 of the swing guide 92 may intersect at a predetermined angle a. In particular, the angle a of intersection between the axis X1 of the sliding guide 91 and the axis X2 of the swing guide 92 may be an obtuse angle, so that the rollers 105 and 106 of the center roller unit 23 may easily be released from the swing guide 92 of the center rail 13 or may easily be received in the swing guide 92 of the center rail 13.

The center rail 13 may include a space 98 allowing the rollers 105 and 106 of the center roller unit 23 to be released from the center rail 13 or be received in the center rail 13 when the vehicle door 5 swings in the swing mode. The space 98 may be defined between the front end 95a of the stopper wall 95 and the rear end 94a of the guide projection 94 as the front end 95a of the stopper wall 95 and the rear end 94a of the guide projection 94 are spaced apart from each other. Due to the space 98, there is no interference when the rollers 105 and 106 of the center roller unit 23 are released from the center rail 13 or are received in the center rail 13 in the swing mode.

According to the exemplary embodiments illustrated in FIGS. 7 and 9A to 9D, the hold locks 31, 32, 33, and 34 mounted on the roller units 21 and 22 may selectively and releasably hold the strikers 31a, 31b, 32a, and 32b mounted on the vehicle body 1 so that the roller units 21 and 22 may be held in the predetermined positions of the rails 11 and 12. However, locking stiffness between the catch of each of the hold locks 31, 32, 33, and 34 and a corresponding one of the strikers 31a, 31b, 32a, and 32b may be relatively insufficient. In the event of a vehicle collision/impact, when a high load is applied between the catch and the striker, the locking of the catch and the striker may be easily released, which may result in unsatisfactory crashworthiness due to deformation of the vehicle door and the opening of the vehicle door during the collision/impact of the vehicle. In addition, a contact area of the catch and the striker may be relatively small, which may cause vibrations when the vehicle door swings. In order to make the vehicle door operate smoothly, clearance may be provided between the catch and the striker, which may cause vibrations, abnormal noise, and the like when the vehicle door swings. In particular, the roller units 21 and 22 may have a plurality of link structures, which may cause vibrations when the vehicle door swings.

To deal with these problems, the vehicle door opening and closing apparatus, according to exemplary embodiments of the present disclosure, may include at least one hold lock mounted on the vehicle body and releasably holding the roller unit. Such a body-side hold lock may include a passing rod 155 releasably engaging with a through hole 60a (see FIG. 24) of the body 60 of each of the roller units 21 and 22 so that it may releasably hold the body 60 of the roller units 21 and 22. Accordingly, locking stiffness between the passing rod 155 of the hold lock and the body 60 of the roller unit may be increased. In the event of a vehicle collision/impact, the deformation of the vehicle door and the opening of the vehicle door may be prevented, and thus satisfactory crashworthiness of the vehicle may be achieved. In addition, a contact area of the passing rod 155 and the body 60 may be sufficient, and clearance between the passing rod 155 and the body 60 may be minimized, thereby preventing the generation of vibrations, abnormal noise, and the like when the vehicle door swings.

Figure 16:
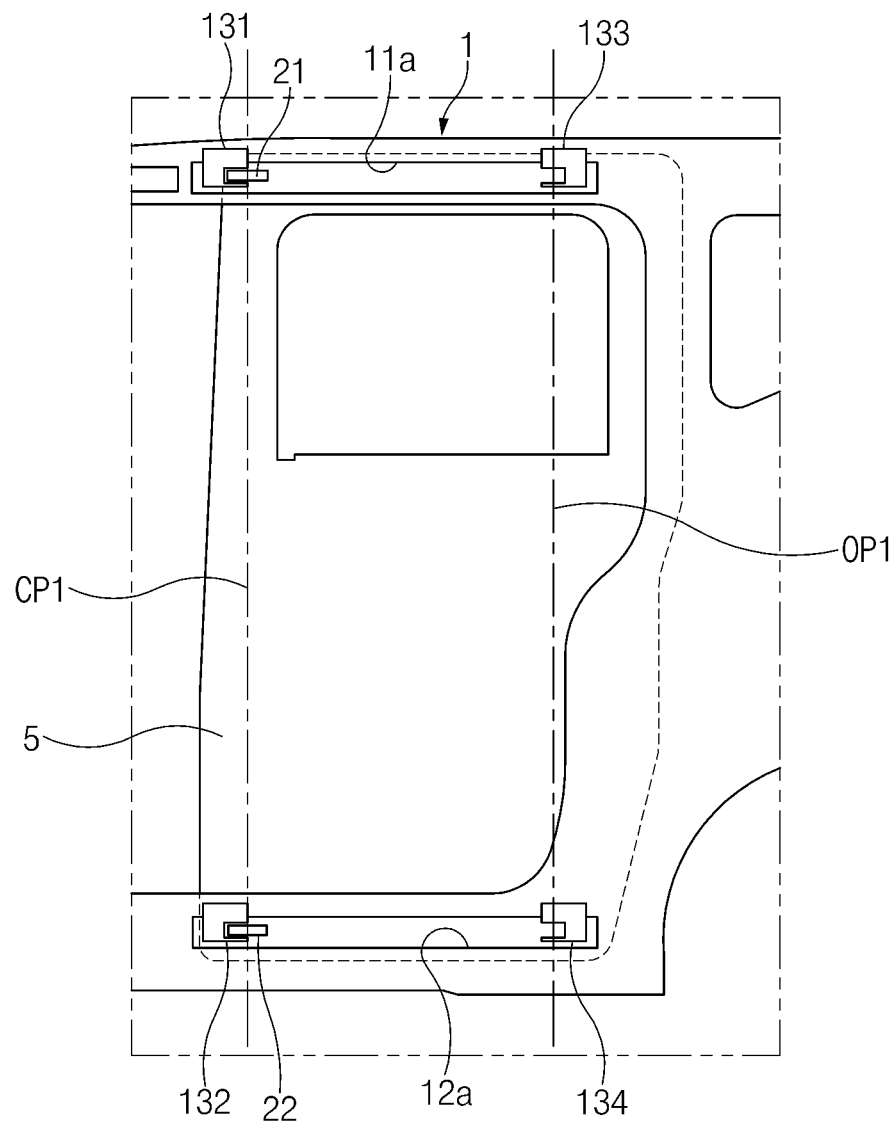
FIG. 16 illustrates a plurality of body-side hold locks mounted on a vehicle body in a vehicle door opening and closing apparatus according to an exemplary embodiment of the present disclosure.

Referring to FIG. 16, the vehicle door opening and closing apparatus, according to exemplary embodiments of the present disclosure, may include a plurality of body-side hold locks 131, 132, 133, and 134 individually mounted on an upper portion of the vehicle body 1 in the first closed position CP1, a lower portion of the vehicle body 1 in the first closed position CP1, an upper portion of the vehicle body 1 in the first open position OP1, and a lower portion of the vehicle body 1 in the first open position OP1. Each of the hold locks 131, 132, 133, and 134 may be mounted on the vehicle body 1, and releasably hold the body 60 of each of the roller units 21 and 22. The vehicle body 1 may have rail slots 11a and 12a in which the rails 11 and 12 are mounted. The bodies 60 of the roller units 21 and 22 may move within the rail slots 11a and 12a.

The plurality of body-side hold locks 131, 132, 133, and 134 may include a first body-side hold lock 131 mounted on the upper portion of the vehicle body 1 in the first closed position CP1, a second body-side hold lock 132 mounted on the lower portion of the vehicle body 1 in the first closed position CP1, a third body-side hold lock 133 mounted on the upper portion of the vehicle body 1 in the first open position OP1, and a fourth body-side hold lock 134 mounted on the lower portion of the vehicle body 1 in the first open position OP1. The first body-side hold lock 131 may perform a function corresponding to that of the upper closed hold lock 31 illustrated in FIG. 7, and the second body-side hold lock 132 may perform a function corresponding to that of the lower closed hold lock 32 illustrated in FIG. 7. The third body-side hold lock 133 may perform a function corresponding to that of the upper open hold lock 33 illustrated in FIG. 7, and the fourth body-side hold lock 134 may perform a function corresponding to that of the lower open hold lock 34 illustrated in FIG. 7.

Figure 17:
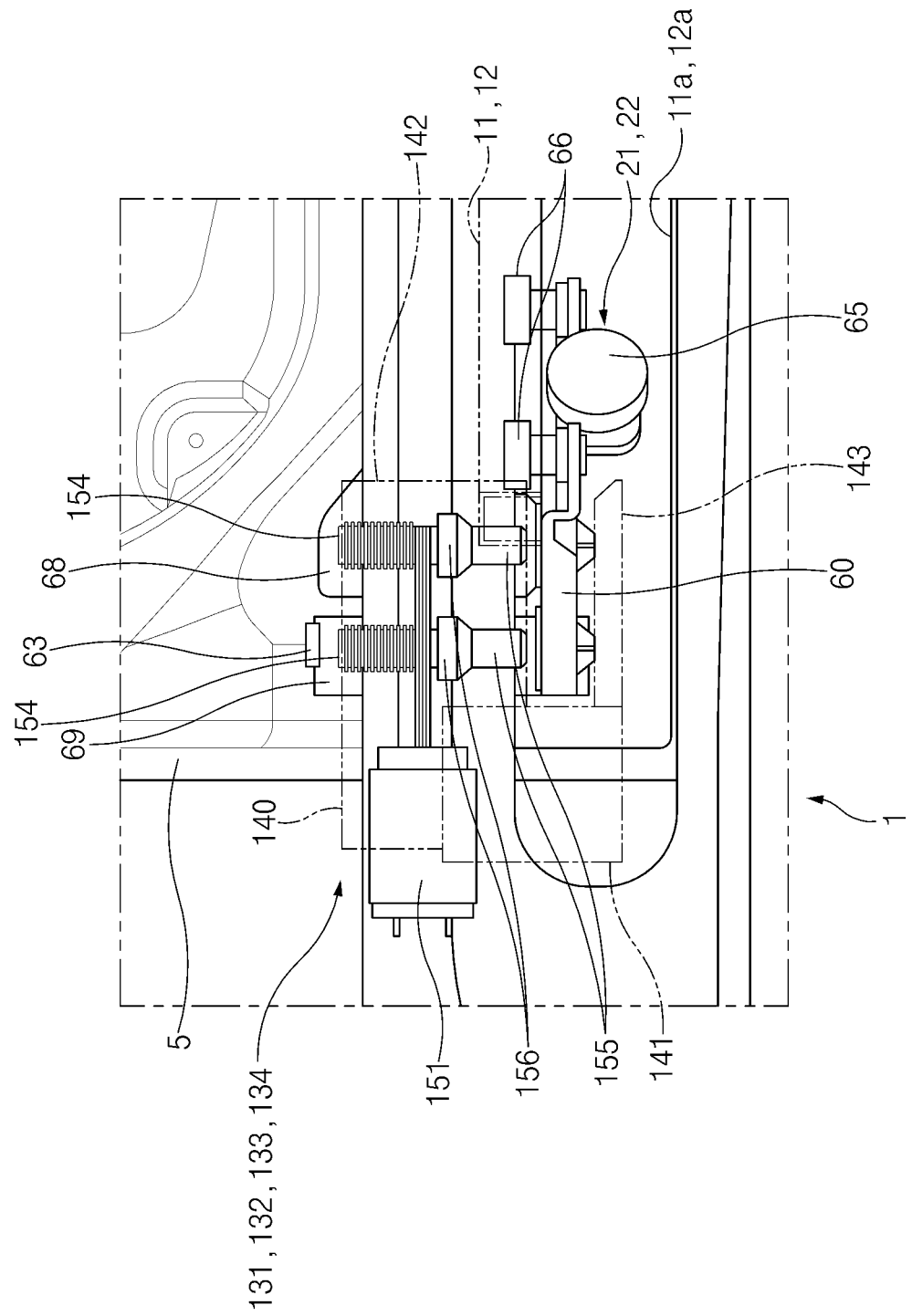
FIG. 17 illustrates a front view of a body-side hold lock and a roller unit in a vehicle door opening and closing apparatus according to an exemplary embodiment of the present disclosure.
Figure 24:
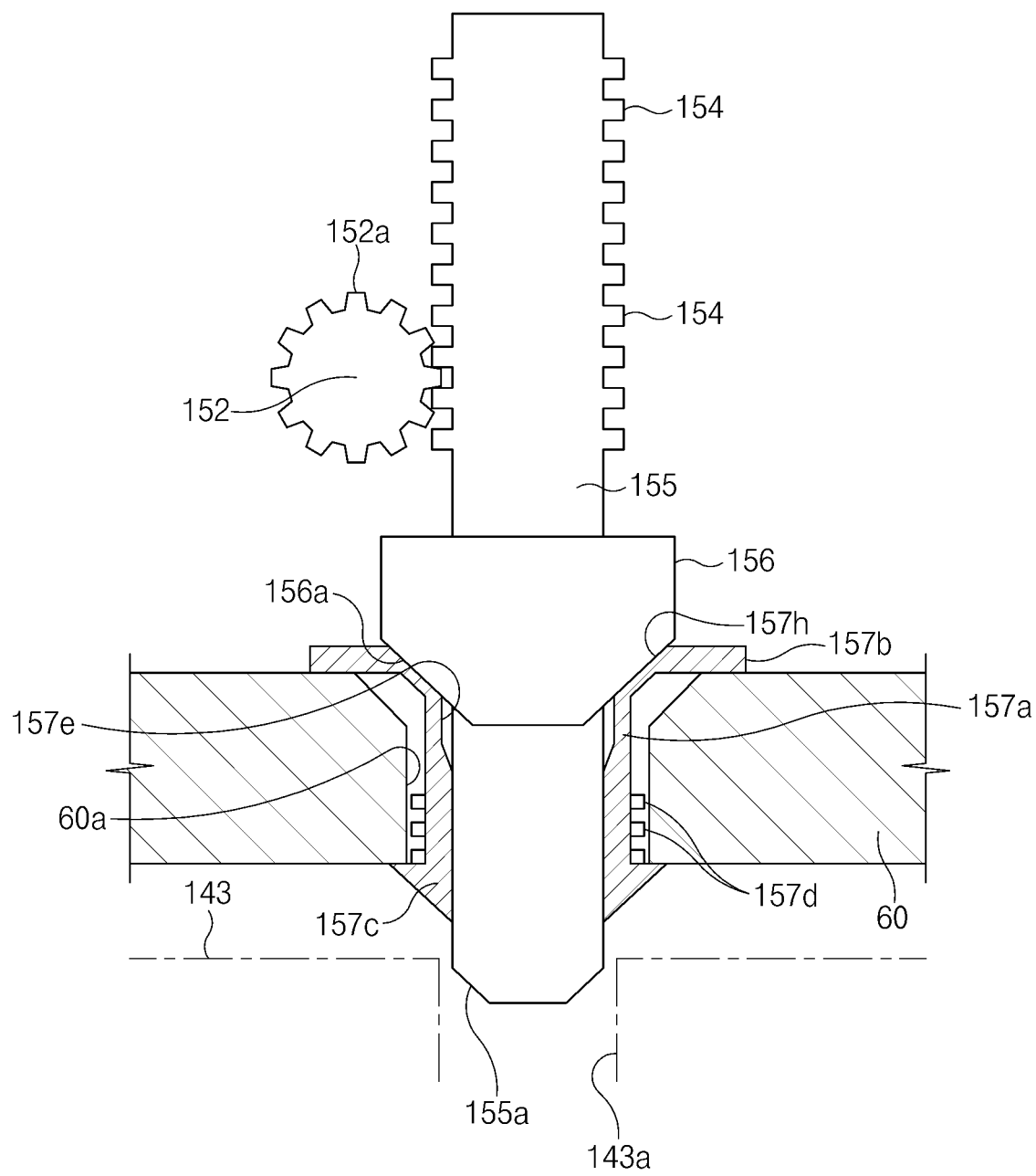
FIG. 24 illustrates a cross-sectional view of a locking state of a passing rod, a grip member, and a body of a roller unit in a vehicle door opening and closing apparatus according to an exemplary embodiment of the present disclosure.
Figure 25:
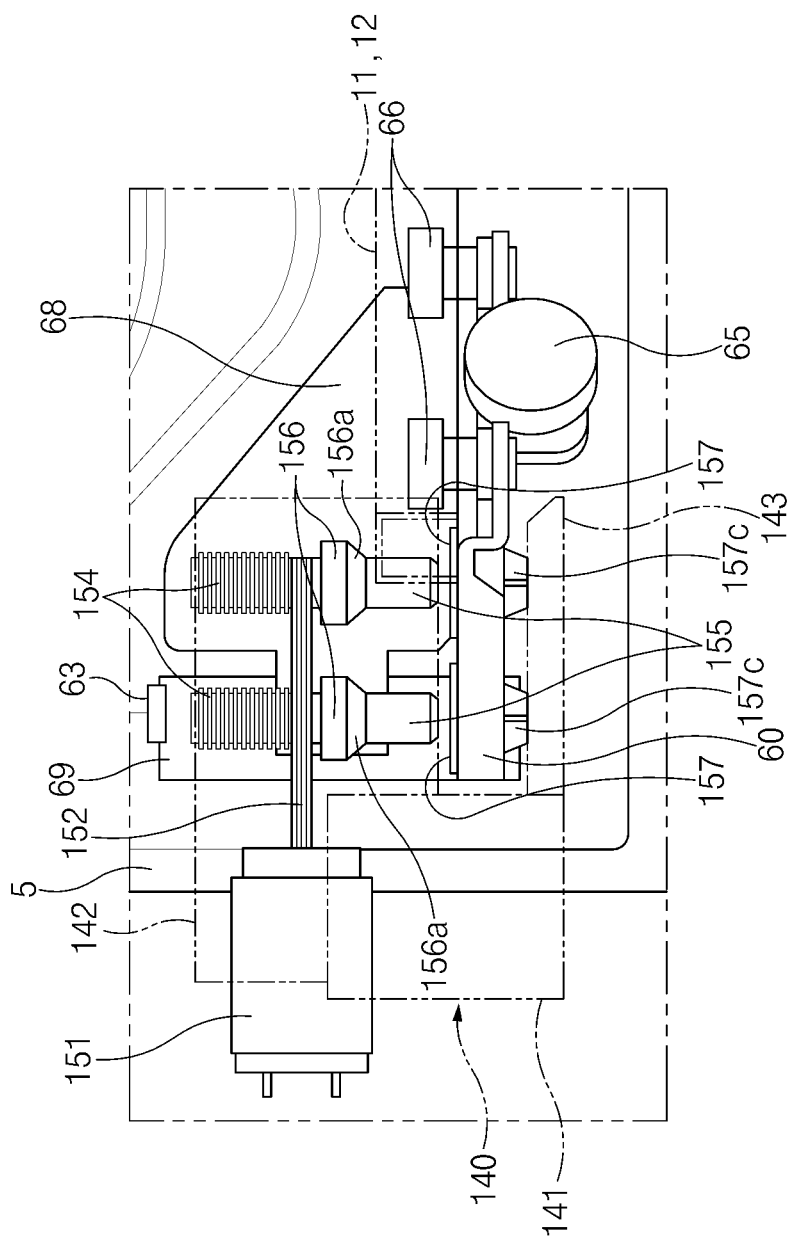
FIG. 25 illustrates a state in which a passing rod of a body-side hold lock releases a roller unit in a vehicle door opening and closing apparatus according to an exemplary embodiment of the present disclosure.

Referring to FIG. 17, each of the body-side hold locks 131, 132, 133, and 134 may include the passing rod 155 releasably engaging with the through hole 60a (see FIG. 24) of the body 60 of the roller units 21 and 22. A longitudinal axis of the passing rod 155 may be perpendicular to a plane of the body 60, and the passing rod 155 may move in a direction perpendicular to the plane of the body 60 of the roller units 21 and 22. As the passing rod 155 passes through the through hole 60a of the body 60, the body 60 may be held by the passing rod 155. As the passing rod 155 moves away from the body 60, the body 60 may be released from the passing rod 155. Referring to FIG. 24, as the passing rod 155 passes through the through hole 60a of the body 60, the passing rod 155 may engage with the through hole 60a of the body 60. Referring to FIG. 25, as the passing rod 155 moves upwardly from the body 60, the passing rod 155 may be released from the through hole 60a of the body 60.

FIG. 17 illustrates the second body-side hold lock mounted on the lower portion of the vehicle body 1 in the first closed position CP1 and its related lower roller unit, but each of the body-side hold locks 131, 132, 133, and 134 may have the same or similar structure.

Figure 18:
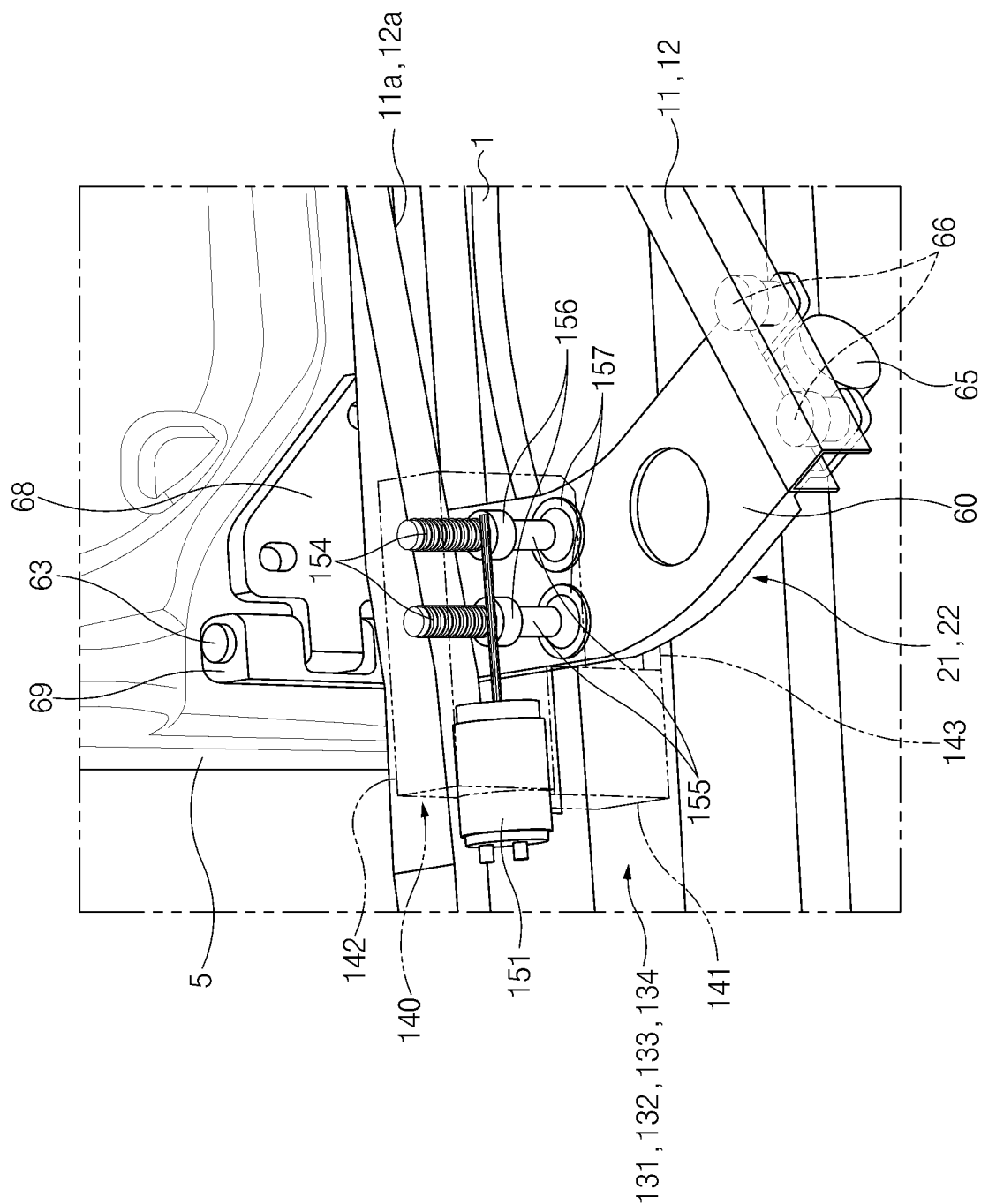
FIG. 18 illustrates a perspective view of a body-side hold lock and a roller unit in a vehicle door opening and closing apparatus according to an exemplary embodiment of the present disclosure.
Figure 19:
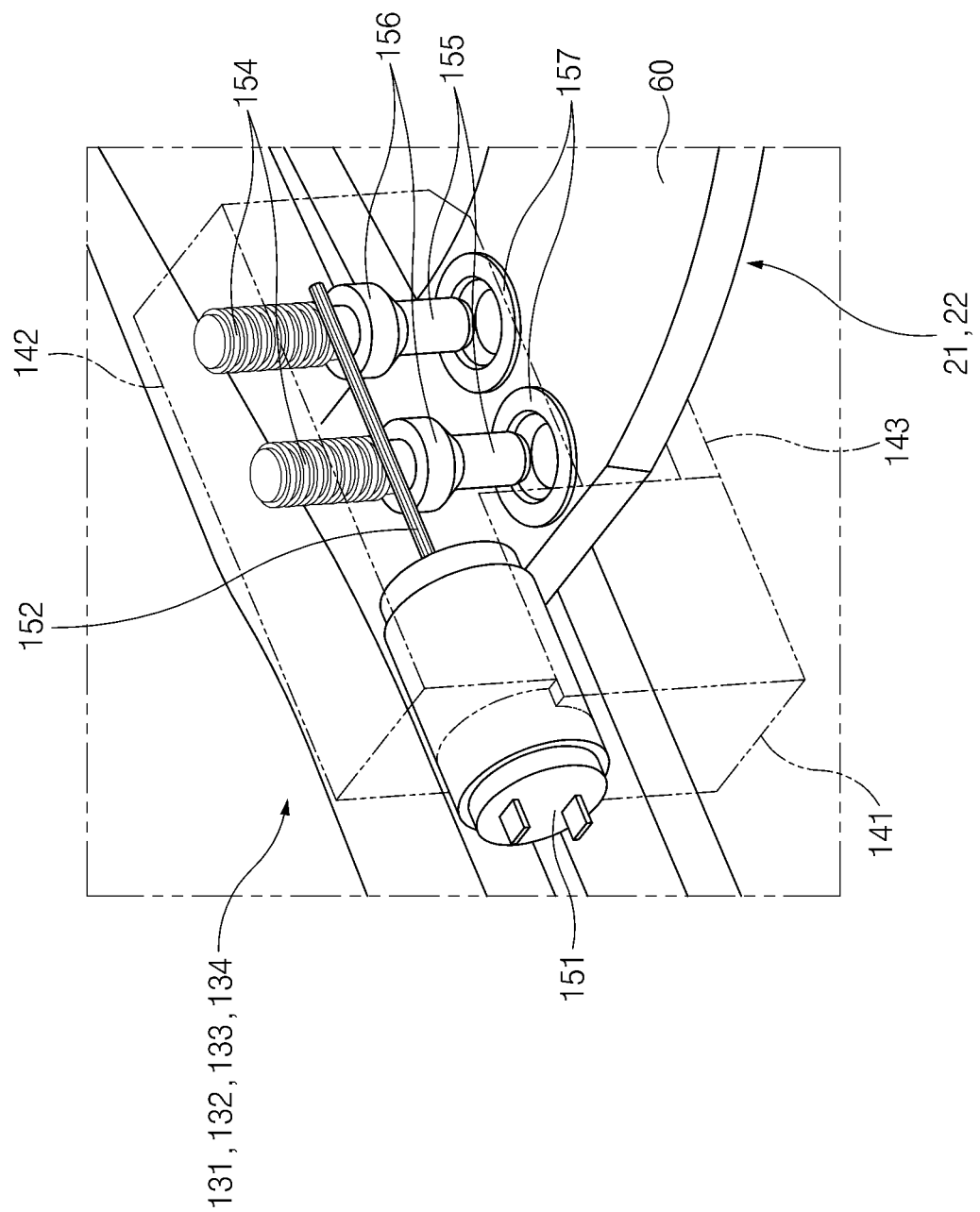
FIG. 19 illustrates an enlarged view of the body-side hold lock and the roller unit illustrated in FIG. 18.
Figure 20:
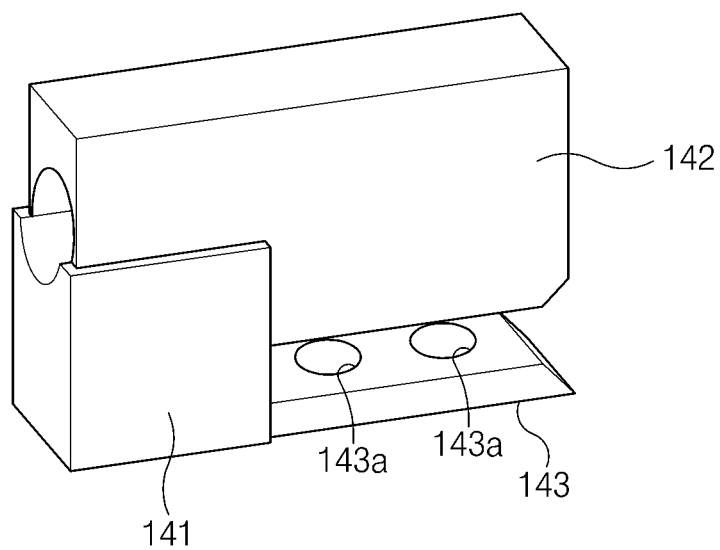
FIG. 20 illustrates a perspective view of a housing of the body-side hold lock illustrated in FIG. 19.

Referring to FIGS. 17 to 19, each of the body-side hold locks 131, 132, 133, and 134 may include a housing 140 mounted on the vehicle body 1. Referring to FIGS. 17 to 20, the housing 140 may include a base portion 141, an upper portion 142 extending from the base portion 141, and a lower portion 143 extending from the base portion 141. The lower portion 143 may be spaced apart from the upper portion 142, and the lower portion 143 may have a through hole 143a in which a lower portion of the passing rod 155 is received. Referring to FIGS. 17 to 19, the body 60 of the roller units 21 and 22 may be located between the upper portion 142 and the lower portion 143.

Figure 21:
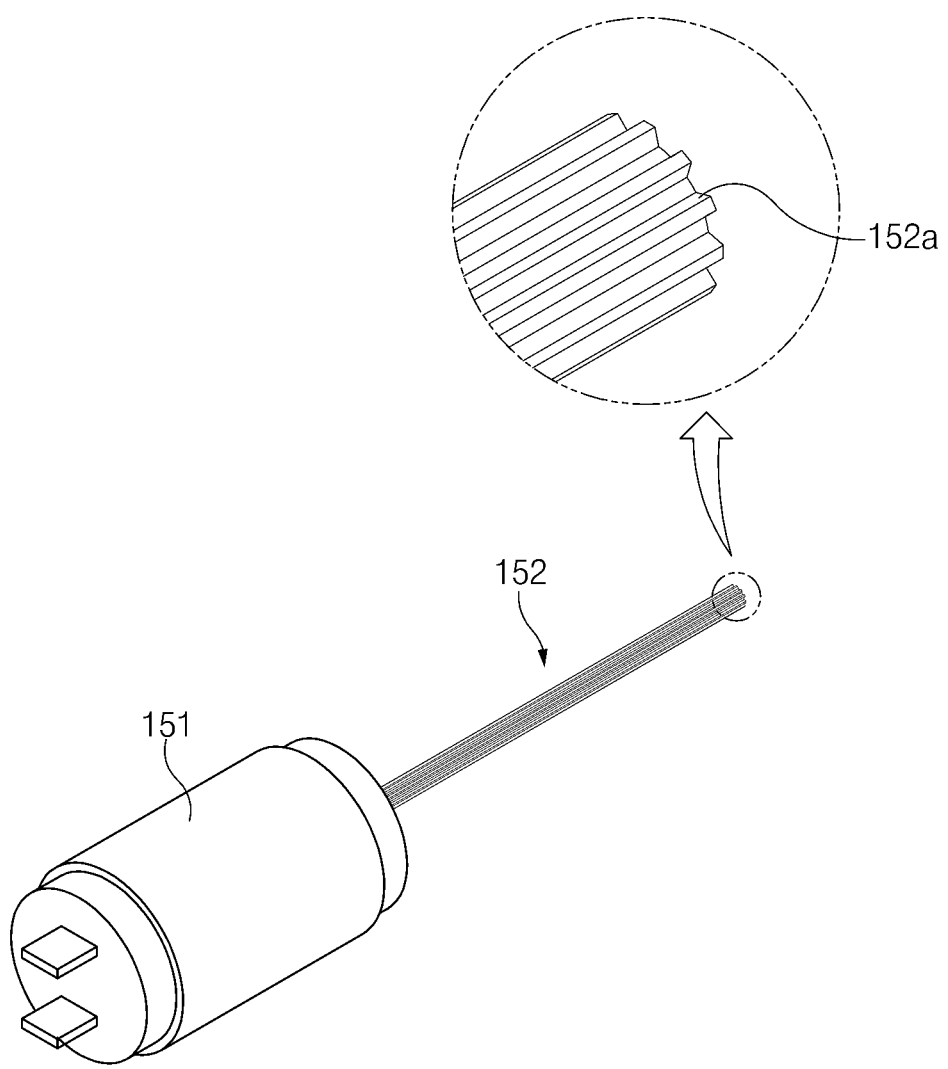
FIG. 21 illustrates a perspective view of an actuator and a drive gear of the body-side hold lock illustrated in FIG. 19.

Referring to FIGS. 17 to 19, the passing rod 155 may move upwardly and downwardly in the upper portion 142 of the housing 140. An actuator 151 may be mounted in the housing 140, and the actuator 151 may be a bidirectional motor which is rotatable in both directions. The actuator 151 may have a drive gear 152, and the drive gear 152 may extend to the passing rod 155. Referring to FIGS. 21 and 24, the drive gear 152 may be a spur gear having a plurality of teeth 152a.

Referring to FIGS. 17 to 19, two passing rods 155 may move vertically in the upper portion 142 of the housing 140. The number of the passing rods 155 may be varied considering the locking stiffness between the passing rod 155 and the body 60 of the roller units 21 and 22, the layout thereof, and the like.

Figure 22:
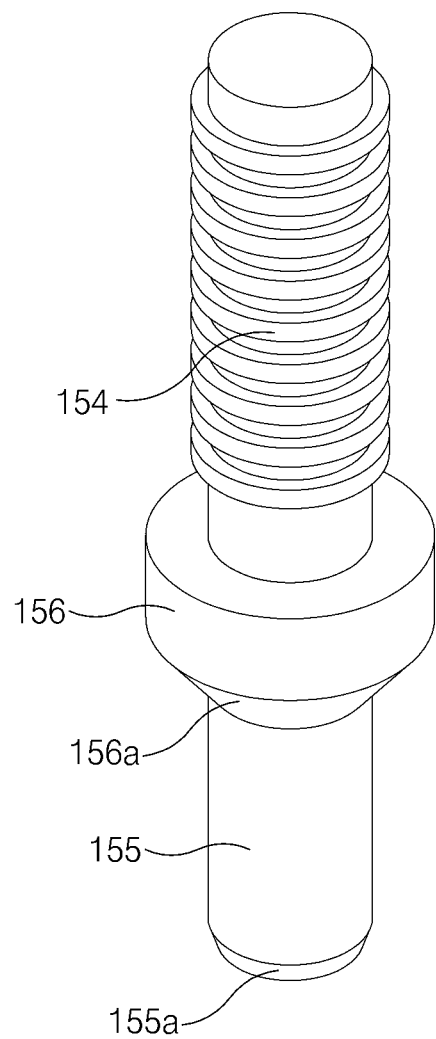
FIG. 22 illustrates a perspective view of a passing rod of the body-side hold lock illustrated in FIG. 19.

Referring to FIG. 22, the passing rod 155 may have a plurality of teeth 154 meshing with the drive gear 152, and the plurality of teeth 154 may be spaced apart from each other in a longitudinal direction of the passing rod 155 so that the plurality of teeth 154 may serve as rack teeth provided on an outer circumferential surface of the passing rod 155. Each tooth 154 may have an annular shape on the outer circumferential surface of the passing rod 155. According to another exemplary embodiment, each tooth 154 may have a partial arc shape such as a fan shape or a semicircular shape on the outer circumferential surface of the passing rod 155. The passing rod 155 may have a tapered surface 155a provided on a lower end thereof. The passing rod 155 may have a stopper 156 provided on a middle portion thereof, and an outer diameter of the stopper 156 may be greater than an outer diameter of the passing rod 155. The stopper 156 may have a tapered surface 156a provided on a lower portion thereof. When the passing rod 155 is inserted into the through hole 60a of the body 60 of the roller units 21 and 22, the stopper 156 may come into contact with the body 60, thereby defining a lower limit position of the passing rod 155.

Figure 23:
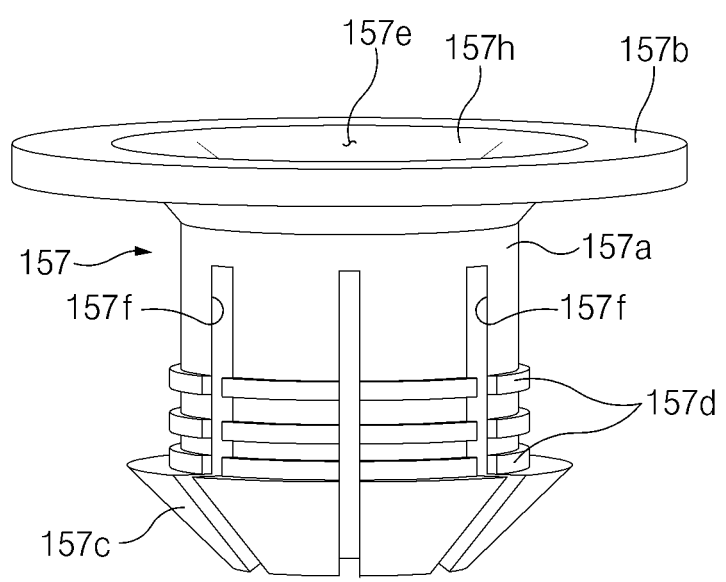
FIG. 23 illustrates a perspective view of a grip member of the body-side hold lock illustrated in FIG. 19.

Referring to FIGS. 17 to 19, a grip member 157 may be mounted on the body 60 of the roller units 21 and 22. When the lower portion of the passing rod 155 passes through the body 60 of the roller units 21 and 22, the grip member 157 may grip the outer circumferential surface of the passing rod 155. Referring to FIG. 23, the grip member 157 may include a cylindrical portion 157a, a head portion 157b provided on an upper end of the cylindrical portion 157a, and a hook 157c provided on a lower end of the cylindrical portion 157a. The grip member 157 may have a hole 157e defined therein, and the lower portion of the passing rod 155 may be inserted into the hole 157e of the grip member 157. A chamfer 157h may be formed on an inner peripheral edge of the head portion 157b adjacent to the hole 157e. A plurality of slits 157f may be formed in a lower portion of the cylindrical portion 157a and the hook 157c, and the plurality of slits 157f may be spaced apart from each other in a circumferential direction of the cylindrical portion 157a. Each slit 157f may extend in a longitudinal direction of the cylindrical portion 157a, and the cylindrical portion 157a and the hook 157c may be radially deformed (extended or contracted) by the plurality of slits 157f. A plurality of pads 157d may be provided on an outer circumferential surface of the cylindrical portion 157a. In particular, the plurality of pads 157d may be located between the plurality of slits 157f.

Referring to FIGS. 17 to 19, two grip members 157 may be disposed to correspond to the two passing rods 155.

According to an exemplary embodiment, the grip member 157 may be made of a resistant plastic material such as polyoxymethylene (POM) and acetal, and the pad 157d may be made of a rubber material.

Referring to FIG. 24, the grip member 157 may be mounted in the through hole 60a of the body 60 of the roller units 21 and 22. The cylindrical portion 157a of the grip member 157 may be inserted into the through hole 60a of the body 60. The head portion 157b of the grip member 157 may be attached to an upper surface of the body 60 adjacent to the through hole 60a, and the hook 157c of the grip member 157 may be attached to a lower surface of the body 60 adjacent to the through hole 60a.

Referring to FIG. 24, as the actuator 151 operates, the drive gear 152 may rotate clockwise or counterclockwise. By the rotation of the drive gear 152, the passing rod 155 may move along the longitudinal axis thereof. As illustrated in FIG. 24, as the drive gear 152 rotates clockwise, the passing rod 155 may move downward to the through hole 60a of the body 60 of the roller units 21 and 22, and accordingly the lower portion of the passing rod 155 may be inserted into the hole 157e of the grip member 157. When the passing rod 155 is inserted into the hole 157e of the grip member 157, the chamfer 157h of the grip member 157 may allow the longitudinal axis of the passing rod 155 to be aligned with a center line of the grip member 157. That is, the passing rod 155 may be accurately centered on the center of the grip member 157 by the chamfer 157h. The tapered surface 156a of the stopper 156 of the passing rod 155 and the chamfer 157h of the grip member 157 may have the same angle of inclination. Accordingly, the tapered surface 156a of the stopper 156 of the passing rod 155 may be seated on the chamfer 157h of the grip member 157 so that the central longitudinal axis of the passing rod 155 may be accurately aligned with the center line of the grip member 157. When the lower portion of the passing rod 155 completely passes through the hole 157e of the grip member 157, the cylindrical portion 157a of the grip member 157 may be radially outwardly extended, and accordingly the plurality of pads 157d may tightly contact an inner circumferential surface of the through hole 60a of the body 60. When the lower portion of the passing rod 155 completely passes through the hole 157e of the grip member 157, the lower end of the passing rod 155 may be inserted into the through hole 143a of the lower portion 143 of the housing 140.

At least a portion of an inner diameter of the cylindrical portion 157a may be less than the outer diameter of the passing rod 155. In particular, the lower portion of the cylindrical portion 157a having the plurality of slits 157f may have an inner diameter less than the outer diameter of the passing rod 155. When the lower portion of the passing rod 155 is inserted into the hole 157e of the grip member 157, the lower portion of the cylindrical portion 157a and the hook 157c may be radially outwardly extended with ease due to the plurality of slits 157f. When the cylindrical portion 157a of the grip member 157 is radially outwardly extended, the plurality of pads 157d may tightly contact the inner circumferential surface of the through hole 60a of the body 60.

When the drive gear 152 rotates in the counterclockwise direction (i.e., release direction), the passing rod 155 may move upward away from the through hole 60a of the body 60 of the roller units 21 and 22. As illustrated in FIG. 25, the lower end of the passing rod 155 may be completely spaced apart from the body 60 of the roller units 21 and 22. Accordingly, the roller units 21 and 22 may be released from the body-side hold locks 131, 132, 133, and 134, and the roller units 21 and 22 may slide along the rails 11 and 12.

When the drive gear 152 rotates in the clockwise direction (i.e., engaging direction), the passing rod 155 may move downward to the through hole 60a of the body 60 of the roller units 21 and 22. As illustrated in FIG. 24, when the passing rod 155 passes through the through hole 60a of the body 60 of the roller units 21 and 22, the lower portion of the passing rod 155 may be tightly gripped by the grip member 157. When the lower end of the passing rod 155 is inserted into the hole 157e of the grip member 157, the lower end of the passing rod 155 may be accurately and easily inserted into the hole 157e of the grip member 157 by the tapered surface 155a.

Figure 26:
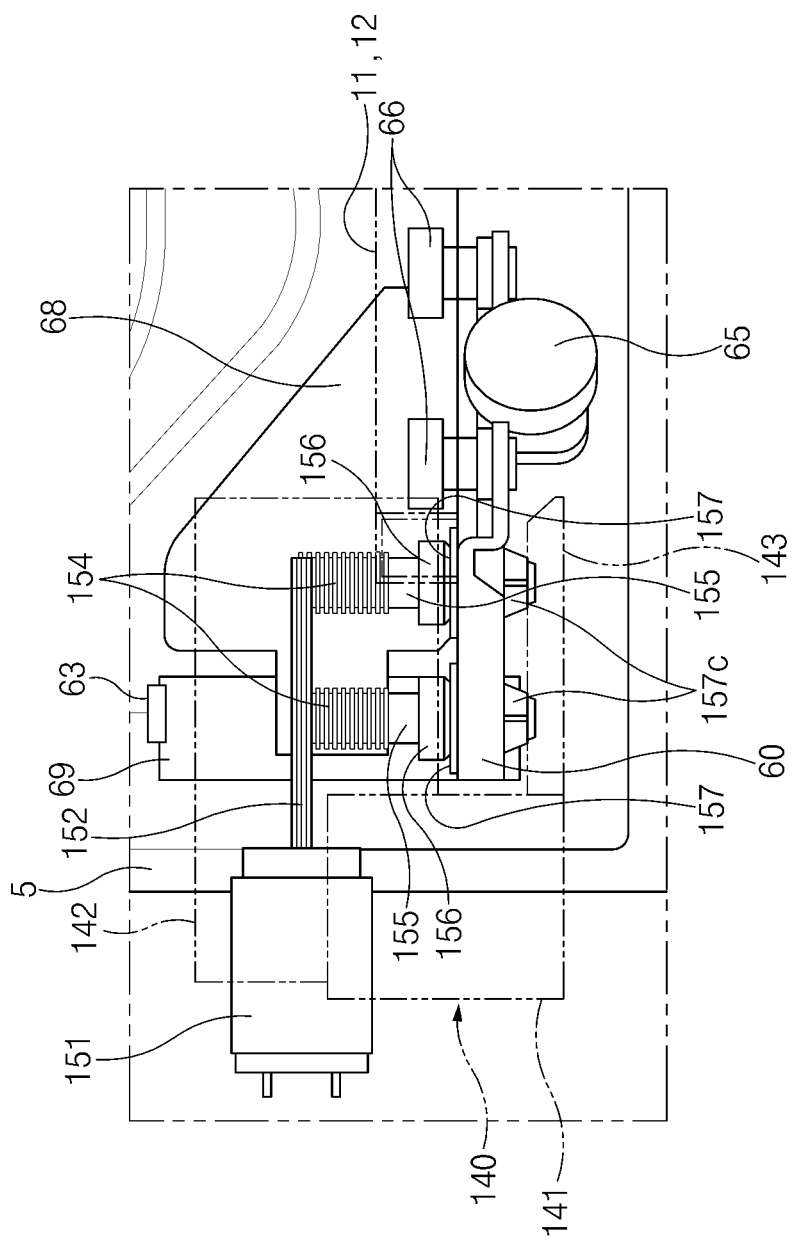
FIG. 26 illustrates a state in which a passing rod of a body-side hold lock holds a roller unit in a vehicle door opening and closing apparatus according to an exemplary embodiment of the present disclosure.

Referring to FIG. 26, the grip member 157 may grip the passing rod 155 so that the body-side hold locks 131, 132, 133, and 134 may tightly hold the body 60 of the roller units 21 and 22. Accordingly, the movement of the roller units 21 and 22 may be blocked, and the vehicle door 5 may swing around the pivot pin 63. Thus, the swing operation of the vehicle door 5 may be performed more stably.

According to an alternative exemplary embodiment, the body-side hold lock illustrated in FIGS. 17 to 26 may only be applied to at least one of the upper portion of the vehicle body in the first closed position CP1, the lower portion of the vehicle body in the first closed position CP1, the upper portion of the vehicle body in the first open position OP1, and the lower portion of the vehicle body in the first open position OP1, and the hold lock illustrated in FIGS. 1, 3, 4, 7, and 9A to 9D may be applied to the other portions thereof.

According to the exemplary embodiments illustrated in FIGS. 16 to 26, at least one hold lock may include the passing rod 155 releasably engaging with the through hole 60a of the body 60 of the roller units 21 and 22 so that it may directly hold the body 60 of the roller units 21 and 22, thereby increasing the locking stiffness between the passing rod 155 of the hold lock and the body 60 of the roller unit. In the event of a vehicle collision/impact, the deformation of the vehicle door and the opening of the vehicle door may be prevented, and thus satisfactory crashworthiness of the vehicle may be achieved. In addition, the contact area of the passing rod 155 and the body 60 may be sufficient, and clearance between the passing rod 155 and the body 60 may be minimized, thereby preventing the generation of vibrations, abnormal noise, and the like when the vehicle door swings. By simplifying a structure for holding the roller units 21 and 22, the number of components may be reduced, and cost reduction and weight reduction may be achieved.

FIGS. 1 to 26 illustrate the vehicle door opening and closing apparatus according to exemplary embodiments of the present disclosure applied to the rear door 5. However, the vehicle door opening and closing apparatus according to exemplary embodiments of the present disclosure may be applied to various vehicle doors, such as front doors, in addition to rear doors.

Figure 27:
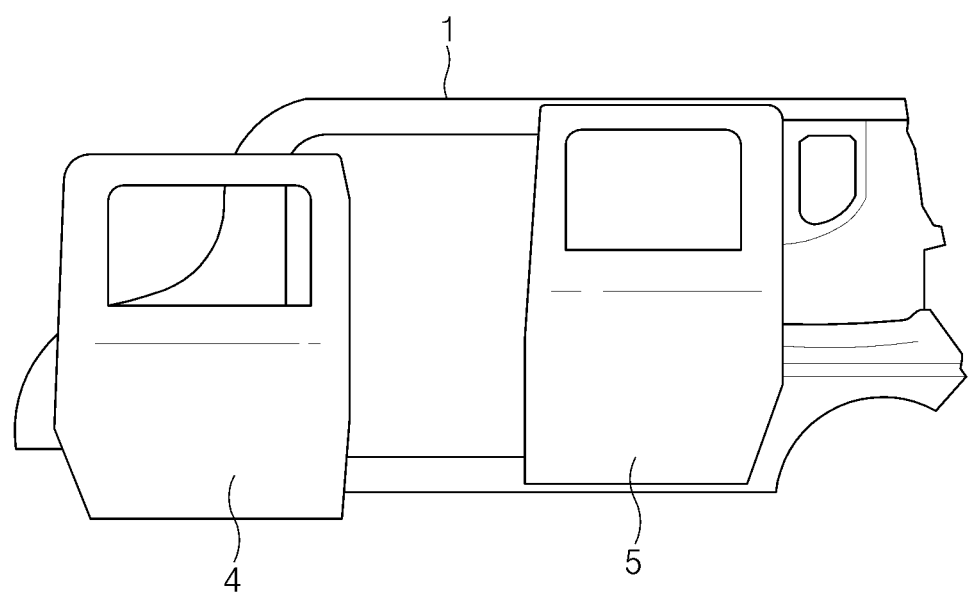
FIG. 27 illustrates a vehicle door opening and closing apparatus according to an exemplary embodiment of the present disclosure, which is applied to a front door of a vehicle, in a state in which the front door is opened in a sliding mode.
Figure 28:
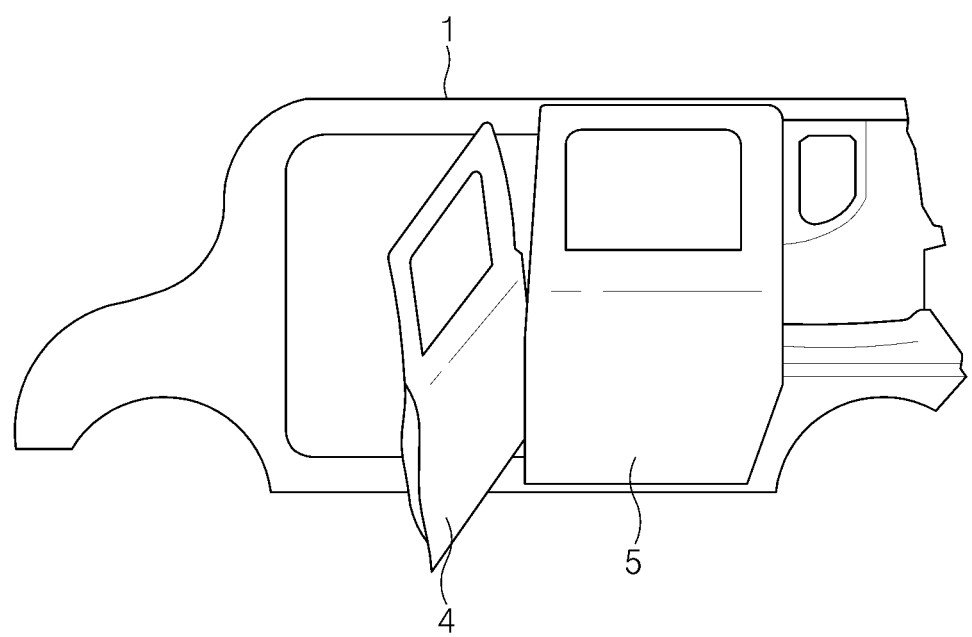
FIG. 28 illustrates a state in which the front door of FIG. 27 is opened in a swing mode.

FIGS. 27 and 28 illustrate the vehicle door opening and closing apparatus according to exemplary embodiments of the present disclosure applied to the front door 4. FIG. 27 illustrates a state in which the front door 4 is opened in the sliding mode, and FIG. 28 illustrates a state in which the front door 4 is opened in the swing mode.

Figure 29:
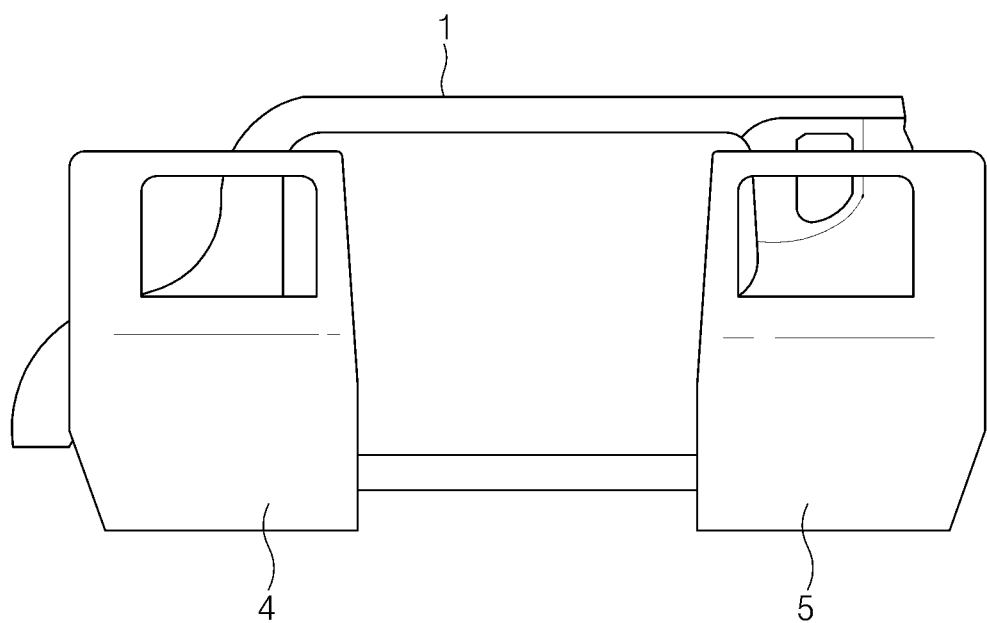
FIG. 29 illustrates a vehicle door opening and closing apparatus according to an exemplary embodiment of the present disclosure, which is applied to a front door and a rear door of a vehicle, in a state in which the front door and the rear door are opened in a sliding mode.
Figure 30:
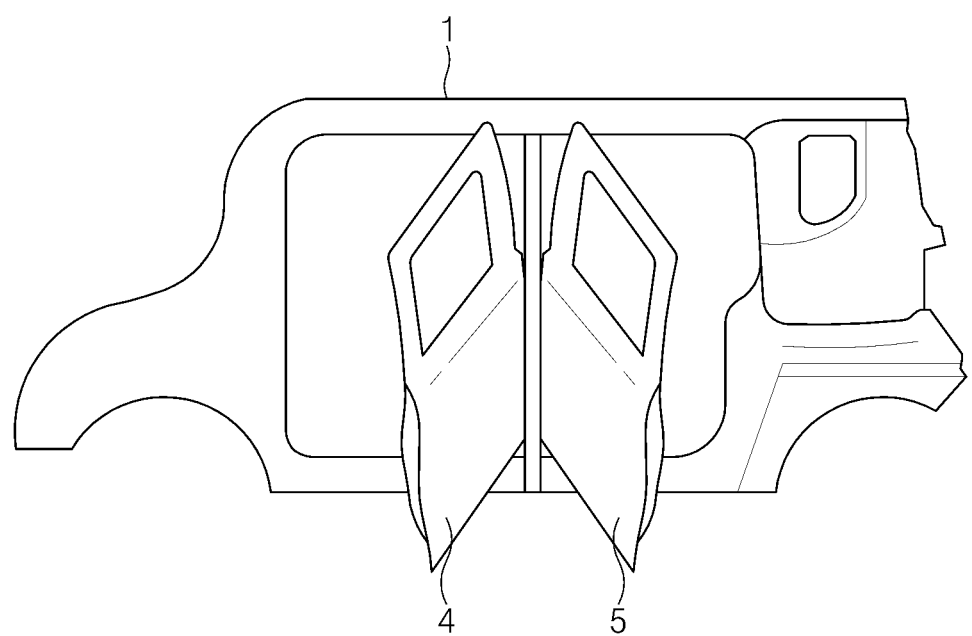
FIG. 30 illustrates a state in which the front door and the rear door of FIG. 29 are opened in a swing mode.

FIGS. 29 and 30 illustrate the vehicle door opening and closing apparatus according to exemplary embodiments of the present disclosure applied to both the front door 4 and the rear door 5. FIG. 29 illustrates a state in which the front door 4 and the rear door 5 are opened in the sliding mode, and FIG. 30 illustrates a state in which the front door 4 and the rear door 5 are opened in the swing mode.

As set forth above, the vehicle door opening and closing apparatus according to exemplary embodiments of the present disclosure may selectively switch the opening/closing operation of the vehicle door into the sliding mode and the swing mode, thereby meeting the needs of users such as convenience and diversity. By selecting the opening/closing operation of the vehicle door depending on the user's situation and environment, convenience and quality may be improved. In particular, the opening/closing operation of the vehicle door may be performed in any one mode selected from the sliding mode and the swing mode depending on the user's situation (location, time, purpose of use, etc.), environment (weather, season, etc.), the occupants' ages (children, adults, the elderly, etc.), and the like, and thus improved ease of use may be achieved. For example, when the vehicle is stopped on the roadside, the swing mode may be selected so that the occupants of all ages may quickly open and close the vehicle door with relatively little force. The sliding mode may be selected in a narrow space such as a parking lot so that a space for ingress and egress of the occupants may be relatively large, which enables quick ingress and egress of the occupants of all ages. The sliding mode may be selected for the ingress and egress of occupants such as small children, the elderly, and the disabled so that a relatively large space for ingress and egress may be provided to those vulnerable occupants. When vehicles are used for camping, loading freight/cargo, etc., the sliding mode may be selected to improve ease of use.

According to exemplary embodiments of the present disclosure, at least one hold lock may be mounted on the vehicle body. The body-side hold lock may include the passing rod releasably engaging with the through hole of the body of the roller unit so that it may releasably hold the body of the roller unit. Accordingly, the locking stiffness between the passing rod of the hold lock and the body of the roller unit may be increased. In the event of a vehicle collision/impact, the deformation of the vehicle door and the opening of the vehicle door may be prevented, and thus satisfactory crashworthiness of the vehicle may be achieved. In addition, the contact area of the passing rod and the body may be sufficient, and clearance between the passing rod and the body may be minimized, thereby preventing the generation of vibrations, abnormal noise, and the like when the vehicle door swings.

In terms of vehicle specifications, the vehicle door opening and closing structure may be standardized, regardless of vehicle models. Thus, the manufacturing cost and investment cost may be significantly reduced.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle door opening and closing apparatus, comprising:
   a vehicle door;
   a rail mounted on a vehicle body;
   a roller unit mounted on the vehicle door, the roller unit configured to move along the rail and allow the vehicle door to open and close in a mode selected from a swing mode and a sliding mode; and
   a hold lock mounted on the vehicle body, the hold lock including a passing rod configured to releasably hold the roller unit in a predetermined position.

2. The vehicle door opening and closing apparatus according to claim 1, wherein the roller unit includes a body having a through hole, and the passing rod is configured to releasably engage with the through hole of the body.

3. The vehicle door opening and closing apparatus according to claim 2, wherein a longitudinal axis of the passing rod is perpendicular to a plane of the body, and the passing rod is configured to move in a direction perpendicular to the plane of the body.

4. The vehicle door opening and closing apparatus according to claim 2, wherein the passing rod is configured to be moved by an actuator in a direction perpendicular to a plane of the body, the actuator having a drive gear, and the passing rod having a plurality of teeth meshing with the drive gear.

5. The vehicle door opening and closing apparatus according to claim 4, wherein the plurality of teeth are spaced apart from each other in a longitudinal direction of the passing rod.

6. The vehicle door opening and closing apparatus according to claim 1, wherein the passing rod has a stopper on a middle portion thereof, and an outer diameter of the stopper is greater than an outer diameter of the passing rod.

7. The vehicle door opening and closing apparatus according to claim 2, further comprising a grip member mounted in the through hole of the body, wherein the grip member is configured to grip the passing rod when the passing rod passes through the through hole of the body.

8. The vehicle door opening and closing apparatus according to claim 7, wherein the grip member has a hole defined therein, and the passing rod is configured to be inserted into the hole of the grip member.

9. The vehicle door opening and closing apparatus according to claim 7, wherein the grip member includes a cylindrical portion, a head portion, and a hook, the cylindrical portion being inserted into the through hole of the body, the head portion on an upper end of the cylindrical portion, and the hook on a lower end of the cylindrical portion.

10. The vehicle door opening and closing apparatus according to claim 9, wherein the head portion is attached to an upper surface of the body adjacent to the through hole, and the hook is attached to a lower surface of the body adjacent to the through hole.

11. The vehicle door opening and closing apparatus according to claim 9, wherein the grip member has a plurality of slits provided in the cylindrical portion and the hook, the plurality of slits being spaced apart from each other in a circumferential direction of the cylindrical portion, and each slit extends in a longitudinal direction of the cylindrical portion.

12. The vehicle door opening and closing apparatus according to claim 11, wherein the grip member further includes a plurality of pads on an outer circumferential surface of the cylindrical portion.

13. The vehicle door opening and closing apparatus according to claim 12, wherein the plurality of pads are between the plurality of slits.

14. The vehicle door opening and closing apparatus according to claim 9, wherein the grip member has a chamfer on an inner peripheral edge of the head portion.

15. A vehicle door apparatus, comprising:
   a vehicle door;
   a rail mounted on a vehicle body;
   a roller unit mounted on the vehicle door, the roller unit including a body having a through hole, the roller unit configured to move along the rail and allow the vehicle door to open and close in a mode selected from a swing mode and a sliding mode;
   an actuator having a drive gear;
   a hold lock mounted on the vehicle body, the hold lock including a passing rod configured to releasably engage with the through hole of the body of the roller unit, the passing rod being configured to be moved by the actuator in a direction perpendicular to a plane of the body, the passing rod having a plurality of teeth configured to be engaged with the drive gear.

16. The vehicle door apparatus according to claim 15, wherein the passing rod has a stopper on a middle portion thereof, and an outer diameter of the stopper is greater than an outer diameter of the passing rod.

17. The vehicle door apparatus according to claim 15, further comprising a grip member mounted in the through hole of the body, wherein the grip member is configured to grip the passing rod when the passing rod passes through the through hole of the body.

18. The vehicle door apparatus according to claim 17, wherein the grip member has a hole defined therein, and the passing rod is configured to be inserted into the hole of the grip member.

19. A vehicle door apparatus, comprising:
   a vehicle door;
   an upper rail, a center rail, and a lower rail mounted on a vehicle body;
   an upper roller unit, a center roller unit, and a lower roller unit on the vehicle door, the upper and lower roller units having a body having a through hole, the upper, center, and lower roller units being configured to move along the respective rail and allow the vehicle door to open and close in a mode selected from a swing mode and a sliding mode;
   an upper hold lock and a lower hold lock on the vehicle body, each of the upper and lower hold locks including a passing rod configured to releasably engage with the through hole of the body of the respective roller unit.

20. The vehicle door apparatus according to claim 19, wherein each of the passing rods has a stopper on a middle portion thereof, and an outer diameter of the stopper is greater than an outer diameter of the passing rod.

* * * * *